US012601896B2

(12) United States Patent
Zhu et al.

(10) Patent No.: US 12,601,896 B2
(45) Date of Patent: Apr. 14, 2026

(54) OPTICAL CAMERA LENS ASSEMBLY

(71) Applicant: Zhejiang Sunny Optics Co., Ltd, Yuyao City (CN)

(72) Inventors: Jiadong Zhu, Yuyao City (CN); Xiancui Ding, Yuyao City (CN); Lin Huang, Yuyao City (CN); Liefeng Zhao, Yuyao City (CN); Fujian Dai, Yuyao City (CN); Zeguang Wang, Yuyao City (CN); Hui Li, Yuyao City (CN); Chao Wang, Yuyao City (CN); Yalin Ren, Yuyao City (CN)

(73) Assignee: Zhejiang Sunny Optics Co., Ltd, Yuyao City (CN)

( * ) Notice: Subject to any disclaimer, the term of this patent is extended or adjusted under 35 U.S.C. 154(b) by 360 days.

(21) Appl. No.: 18/300,878

(22) Filed: Apr. 14, 2023

(65) Prior Publication Data

US 2024/0019664 A1    Jan. 18, 2024

(30) Foreign Application Priority Data

Jul. 15, 2022    (CN) .......................... 202210836301.2

(51) Int. Cl.
G02B 13/00      (2006.01)
G02B 7/02       (2021.01)
G02B 9/64       (2006.01)

(52) U.S. Cl.
CPC ......... G02B 13/0045 (2013.01); G02B 7/021 (2013.01); G02B 9/64 (2013.01)

(58) Field of Classification Search
CPC ....... G02B 13/0045; G02B 7/021; G02B 9/64
See application file for complete search history.

(56) References Cited

U.S. PATENT DOCUMENTS

| 2019/0369368 A1* | 12/2019 | Jung ................. G02B 13/0045 |
|---|---|---|
| 2022/0113516 A1 | 4/2022 | Li et al. |

FOREIGN PATENT DOCUMENTS

| CN | 207764467 U | 8/2018 |
|---|---|---|
| CN | 113204099 A | 8/2021 |
| CN | 113885171 A | 1/2022 |
| CN | 218003831 U | 12/2022 |
| WO | 2019/148755 A1 | 8/2019 |

OTHER PUBLICATIONS

Communication dated Mar. 2, 2026 form the State Intellectual Property Office fo the P.R. of China in Application No. 202311108566. 1.

* cited by examiner

*Primary Examiner* — Wen Huang
(74) *Attorney, Agent, or Firm* — Sughrue Mion, PLLC

(57)    ABSTRACT

An optical camera lens assembly is provided, including: a lens group, including a first lens, a second lens, a third lens, a fourth lens, a fifth lens, a sixth lens and a seventh lens arranged sequentially along an optical axis from an object side to an image side, where each of the first, the fourth, and the sixth lens has a positive refractive power, and each of the second, the third, the fifth, and the seventh lens has a negative refractive power; and a plurality of spacing elements, including a third spacing element disposed between the third lens and the fourth lens and in contact with an image-side surface of the third lens; the optical camera lens assembly satisfies: $3.0<(R3+R4)/d3s<5.0$.

20 Claims, 10 Drawing Sheets

110

120
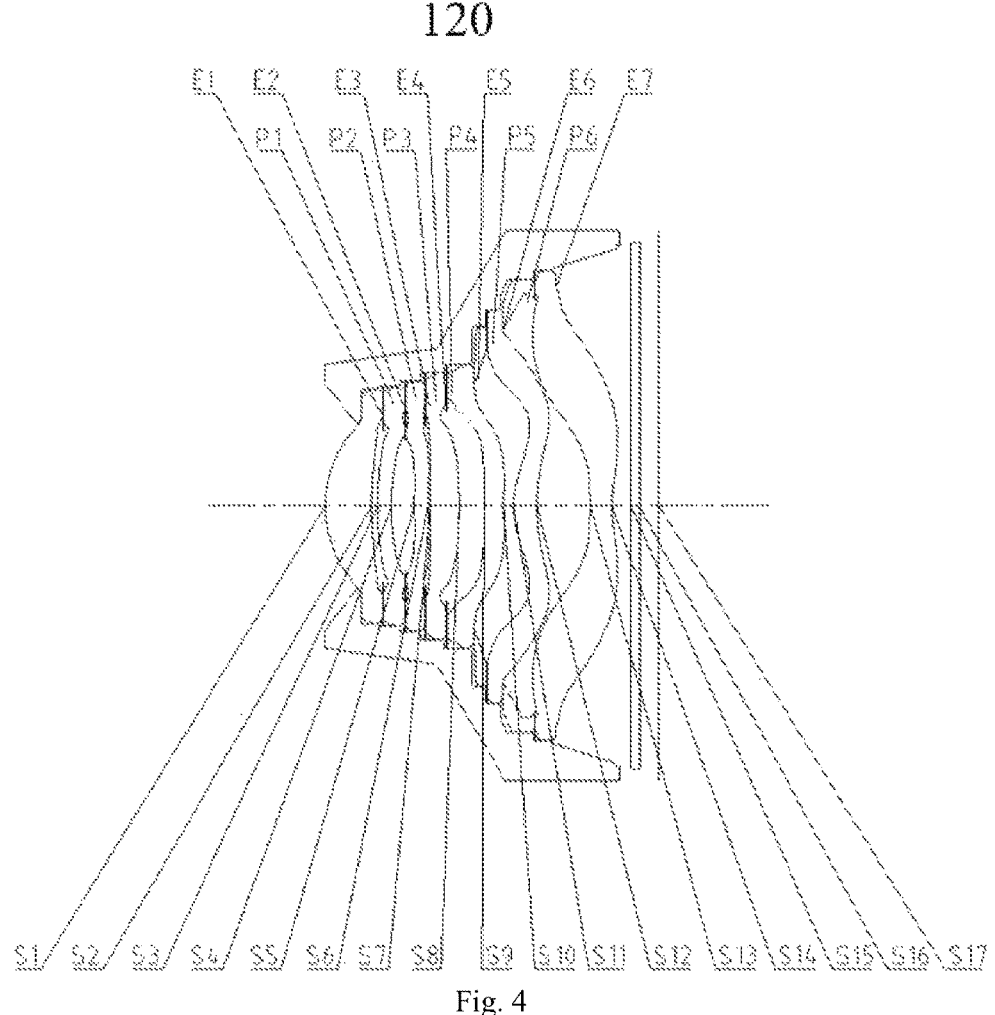
Fig. 4
longitudinal aberration curve
astigmatic curve
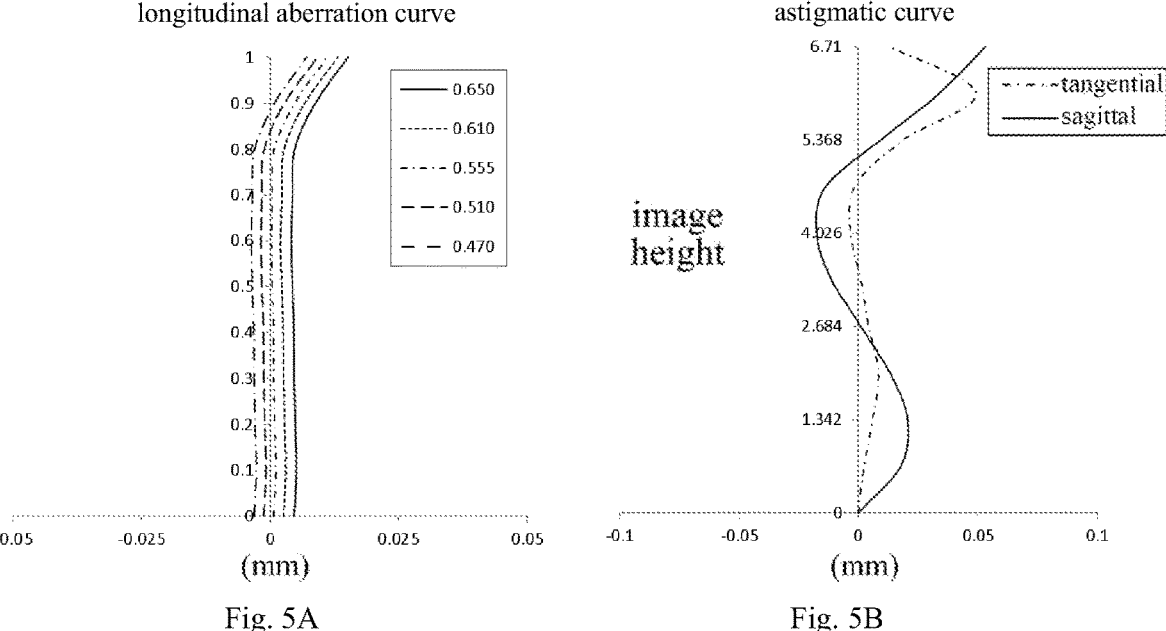
(mm)
(mm)
Fig. 5A                    Fig. 5B distortion curve image height lateral color curve

210

220
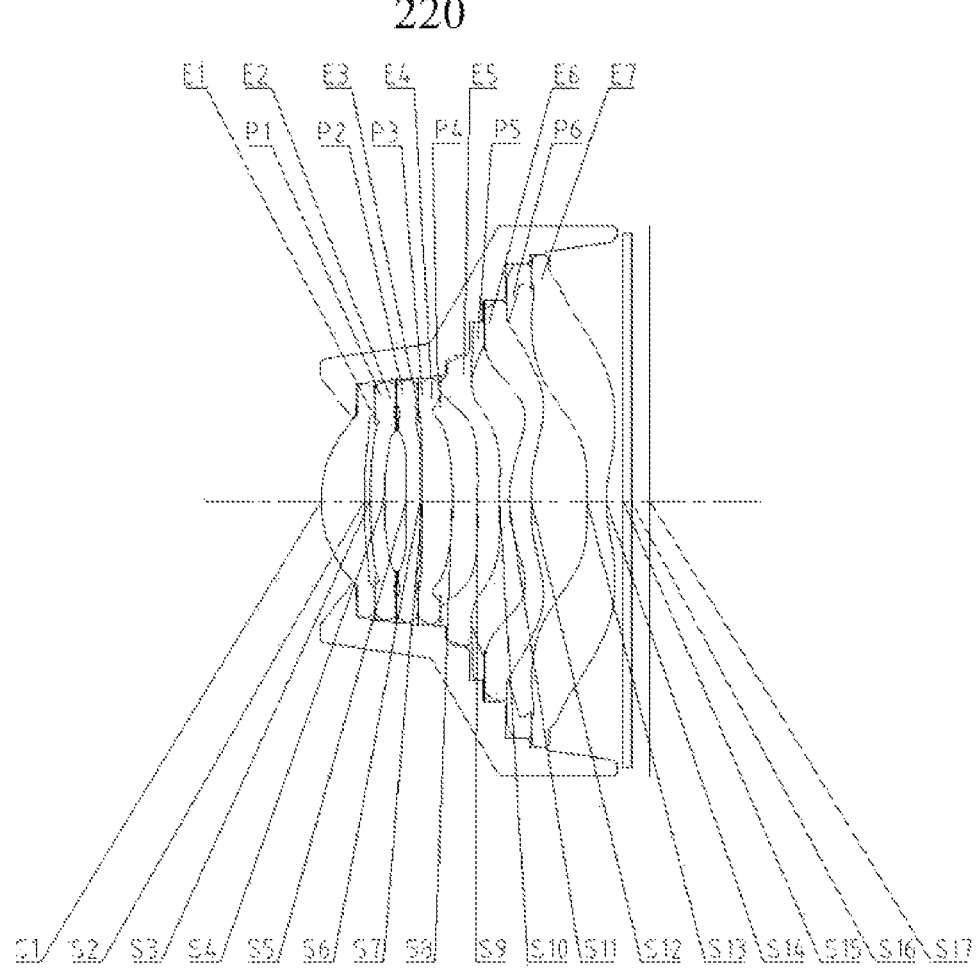
Fig. 7
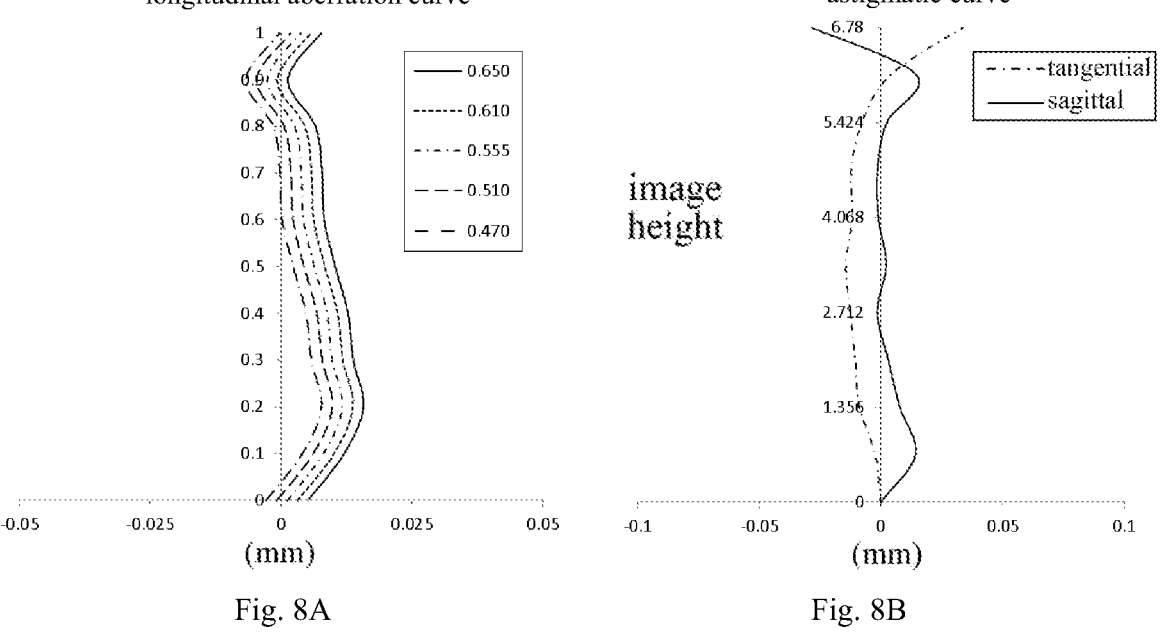
longitudinal aberration curve
astigmatic curve
Fig. 8A                                    Fig. 8B

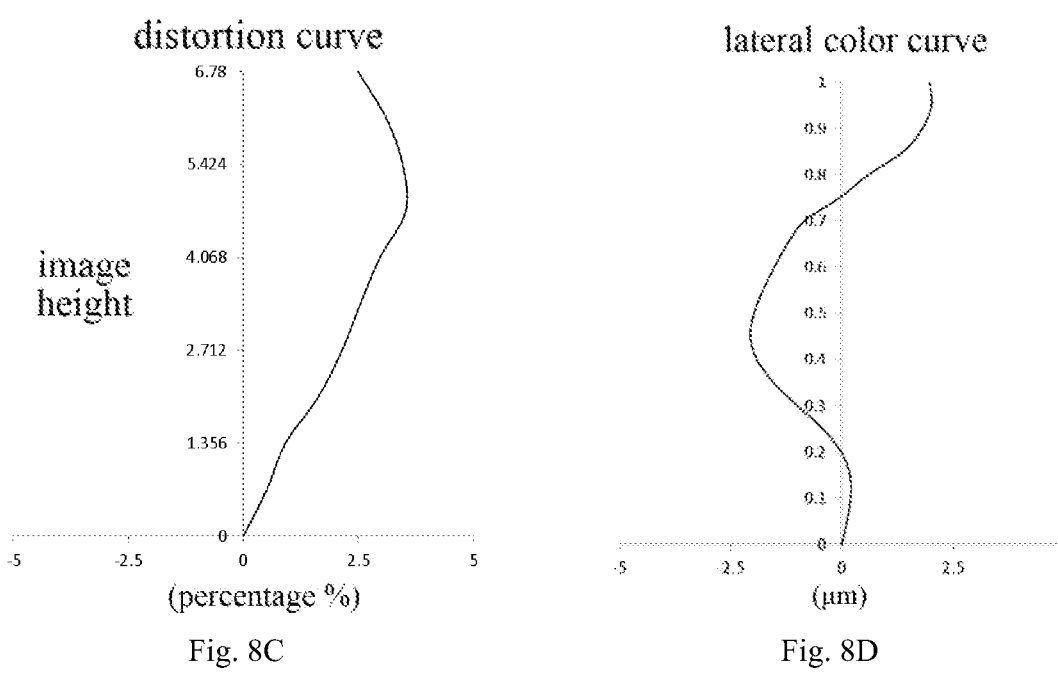
distortion curve
lateral color curve
Fig. 8C
Fig. 8D
310
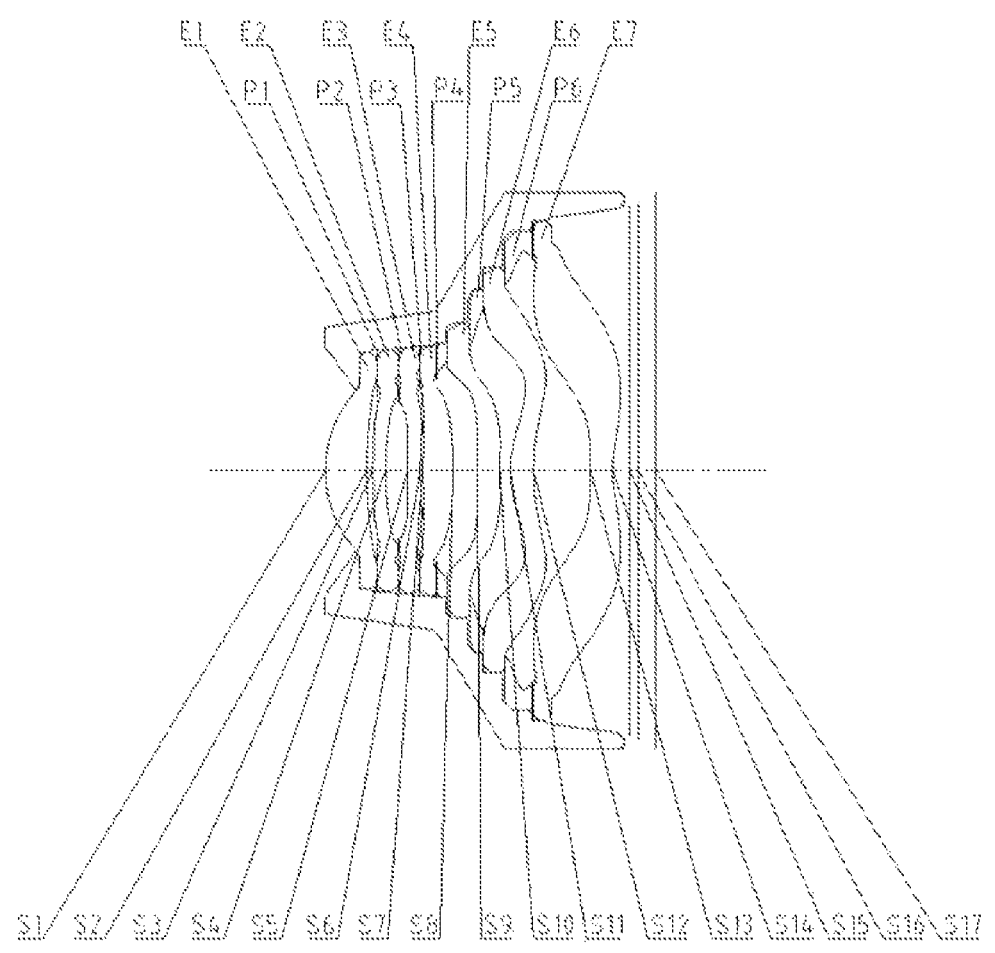
Fig. 9

320
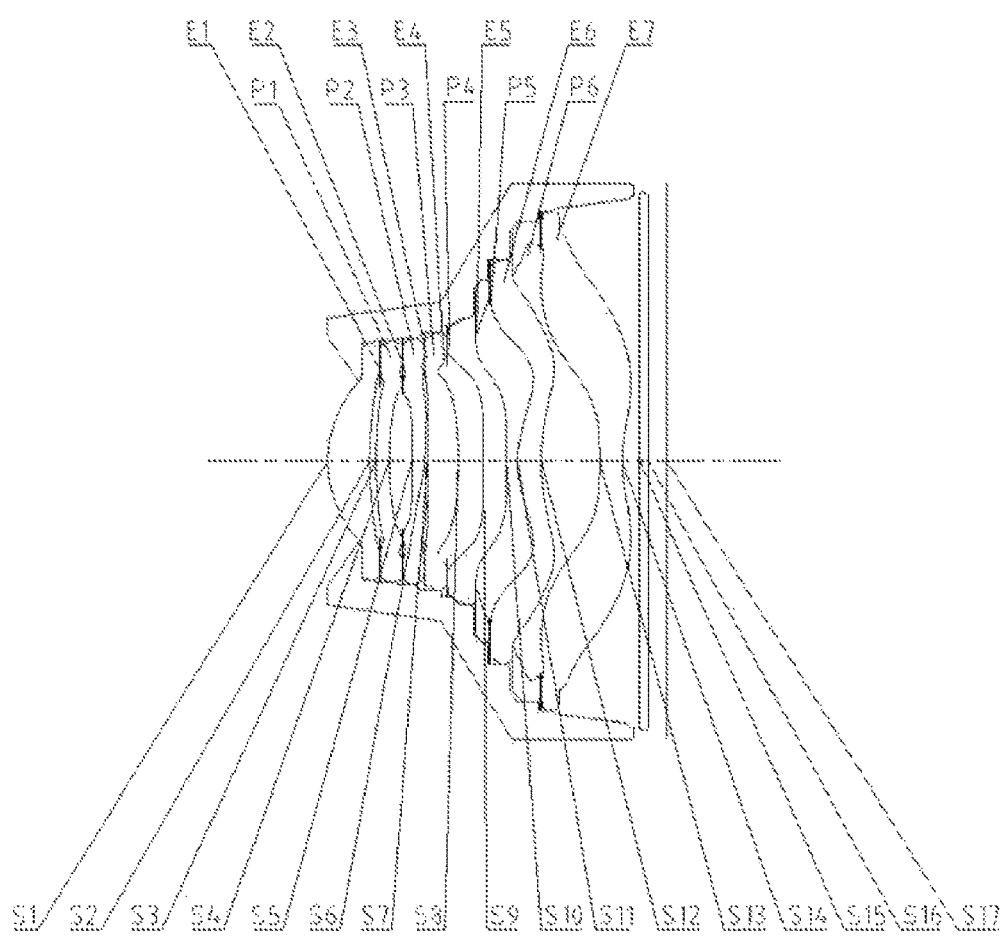
Fig. 10
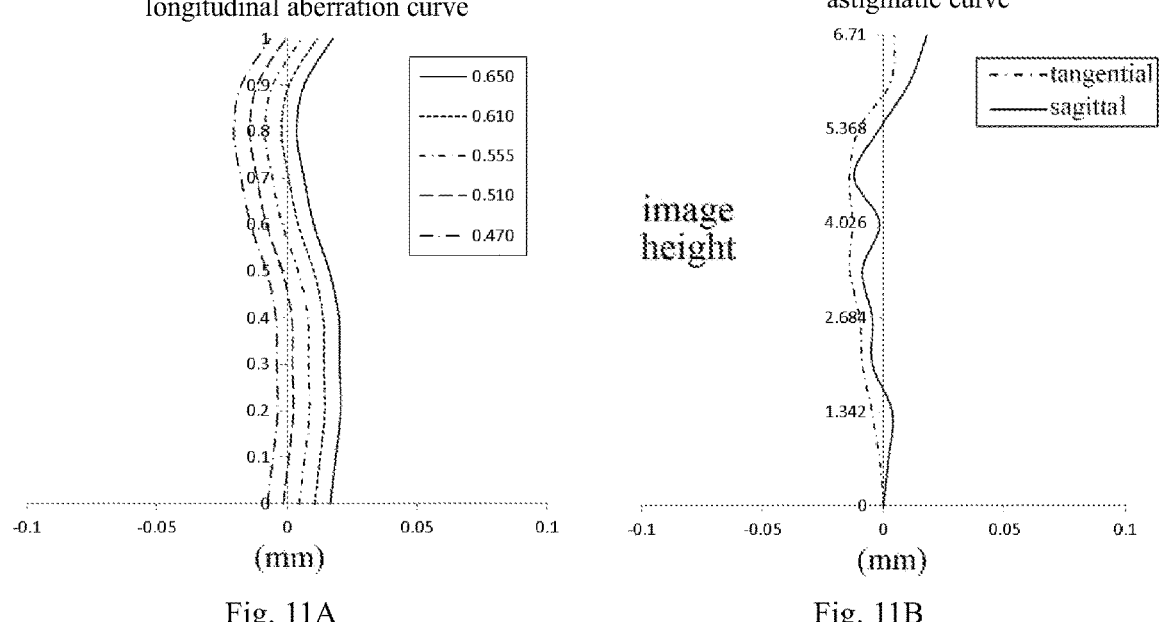
Fig. 11A                                                    Fig. 11B

410

420
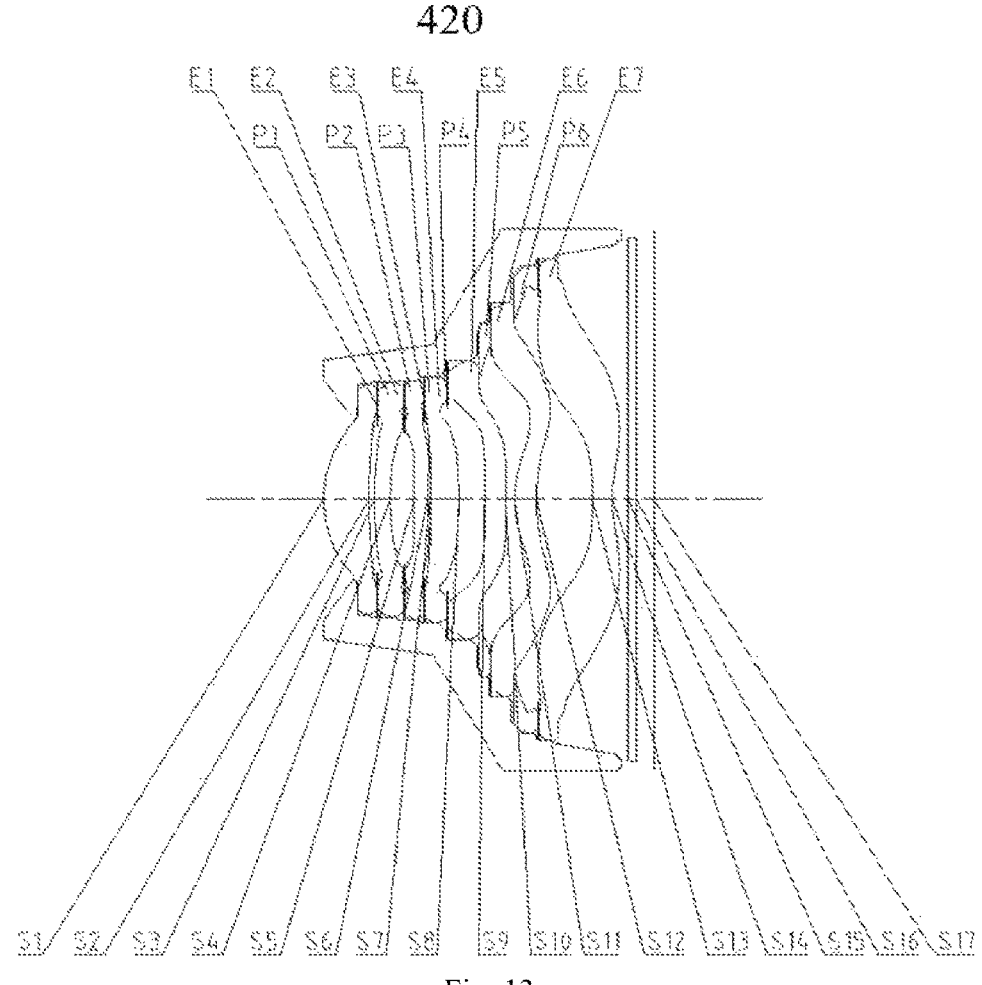
Fig. 13
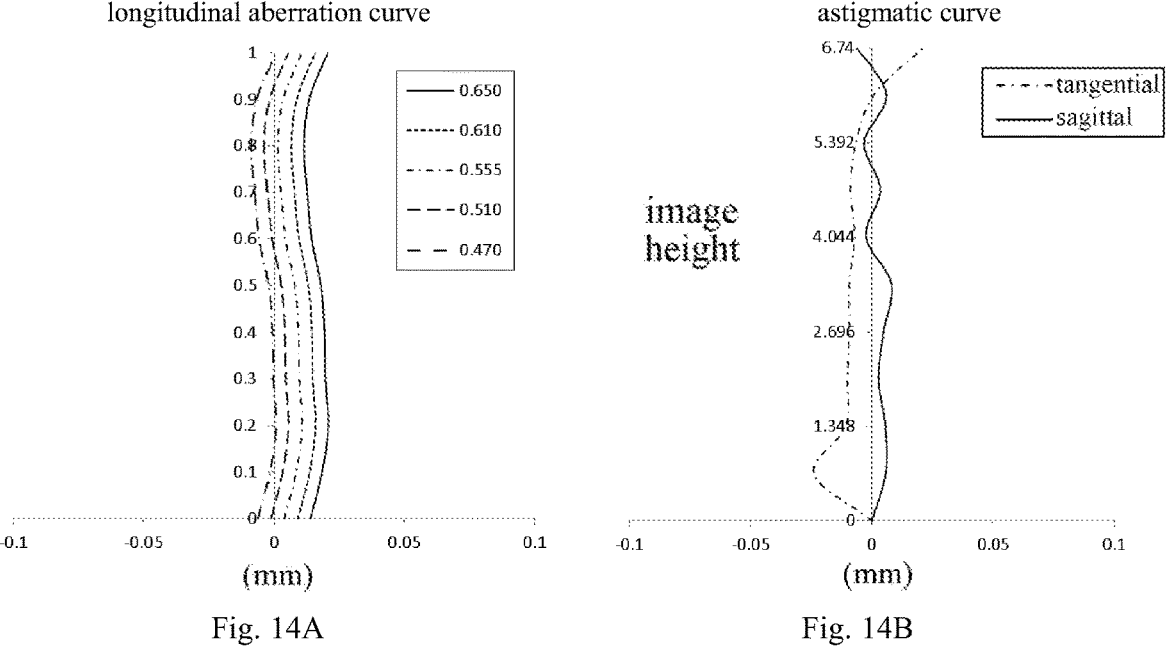
Fig. 14A
Fig. 14B distortion curve image height (percentage %)

lateral color curve (μm)

OPTICAL CAMERA LENS ASSEMBLY

CROSS-REFERENCE TO RELATED APPLICATIONS

This application claims benefit of priority to Chinese Patent Application No. 202210836301.2 filed on Jul. 15, 2022 before the China National Intellectual Property Administration, the entire disclosure of which is incorporated herein by reference in its entity.

TECHNICAL FIELD

The present disclosure relates to the field of optical elements, and in particular, to an optical camera lens assembly.

BACKGROUND

With the development of science and technology, people impose higher and higher requirements for a photographing effect of a mobile phone in different scenarios. At present, an image plane used for mobile phones is getting larger and larger. In order to ensure clear imaging and a good image quality of a lens assembly, it is necessary to improve an ability of the lens assembly to avoid stray light when photographing, and it is also necessary to improve assembly stability of the lens assembly. The assembly stability of the lens assembly and the ability of the lens assembly to avoid stray light are affected by a structural arrangement of lenses, sizes of inner and outer diameters of spacing elements and their thicknesses. Therefore, how to reasonably and effectively set the structural arrangement of the lenses, the sizes and the thicknesses of the inner and outer diameters of the spacing elements, so as to avoid stray light and improve the assembly stability of the lens assembly, especially how to improve stray light in a non-imaging part of a second lens, is an urgent problem to be solved.

SUMMARY

In one aspect, the present disclosure provides an optical camera lens assembly, and the optical camera lens assembly includes: a lens group, including a first lens, a second lens, a third lens, a fourth lens, a fifth lens, a sixth lens and a seventh lens arranged sequentially along an optical axis from an object side to an image side, where, each of the first lens, the fourth lens, and the sixth lens has a positive refractive power, and each of the second lens, the third lens, the fifth lens, and the seventh lens has a negative refractive power; and spacing elements, including a third spacing element disposed between the third lens and the fourth lens and in contact with an image-side surface of the third lens; the optical camera lens assembly satisfies: $3.0<(R3+R4)/d3s<5.0$, where, R3 is a radius of curvature of an object-side surface of the second lens, R4 is a radius of curvature of an image-side surface of the second lens, and d3s is an inner diameter of an object-side surface of the third spacing element.

In an implementation, at least one surface from an object-side surface of the first lens to an image-side surface of the sixth lens is an aspheric surface.

In an implementation, the optical camera lens assembly further comprises a lens barrel, the lens barrel is configured to accommodate the lens group and the plurality of spacing elements, the plurality of spacing elements further comprise a first spacing element disposed between the first lens and the second lens and in contact with an image-side surface of the first lens, and the optical camera lens assembly satisfies: $14.0<(EP01+CT1)/T12<19.0$, where, EP01 is a distance from an object-side end surface of the lens barrel to the first spacing element in a direction of the optical axis, CT1 is a center thickness of the first lens on the optical axis, and T12 is an air spacing between the first lens and the second lens on the optical axis.

In an implementation, the plurality of spacing elements further comprise a first spacing element disposed between the first lens and the second lens and in contact with an image-side surface of the first lens and a second spacing element disposed between the second lens and the third lens and in contact with the image-side surface of the second lens, and the optical camera lens assembly satisfies: $38.0<(d1s-d2s+CT2)/CP2<45.0$, where, CT2 is a center thickness of the second lens on the optical axis, d1s is an inner diameter of an object-side surface of the first spacing element, d2s is an inner diameter of an object-side surface of the second spacing element, and CP2 is a maximum thickness of the second spacing element.

In an implementation, the optical camera lens assembly satisfies: $12.0<(R5-R6)/(d3s-d25)<17.0$, where, d2s is the inner diameter of the object-side surface of the second spacing element, d3s is an inner diameter of an object-side surface of the third spacing element, R5 is a radius of curvature of the object-side surface of the third lens, and R6 is a radius of curvature of an image-side surface of the third lens.

In an implementation, the plurality of spacing elements further comprise a second spacing element disposed between the second lens and the third lens and in contact with the image-side surface of the second lens, and the optical camera lens assembly satisfies: $57.0<(T23+EP23)/CP3<61.0$, where, T23 is an air spacing between the second lens and the third lens on the optical axis, CP3 is a maximum thickness of the third spacing element, and EP23 is a spacing between the second spacing element and the third spacing element.

In an implementation, the optical camera lens assembly satisfies: $-5.5<f3/D3s<-4.0$, where, f3 is an effective focal length of the third lens, and D3s is an outer diameter of the object-side surface of the third spacing element.

In an implementation, the plurality of spacing elements further comprise a fourth spacing element disposed between the fourth lens and the fifth lens and in contact with an image-side surface of the fourth lens, and the optical camera lens assembly satisfies: $1.0<(R7+R8)/(D4s+d4s)<5.0$, where, R7 is a radius of curvature of an object-side surface of the fourth lens, R8 is a radius of curvature of an image-side surface of the fourth lens, D4s is an outer diameter of an object-side surface of the fourth spacing element, and d4s is an inner diameter of the object-side surface of the fourth spacing element.

In an implementation, the optical camera lens assembly satisfies: $1.0<(CT4+T34)/(EP34+CP4)<2.5$, where, CT4 is a center thickness of the fourth lens on the optical axis, T34 is an air spacing between the third lens and the fourth lens on the optical axis, EP34 is a spacing between the third spacing element and the fourth spacing element, and CP4 is a maximum thickness of the fourth spacing element.

In an implementation, the plurality of spacing elements further comprise a fifth spacing element disposed between the fifth lens and the sixth lens and in contact with an image-side surface of the fifth lens, and the optical camera lens assembly satisfies: $3.5<R9/d5m<5.5$, where, R9 is a radius of curvature of an object-side surface of the fifth lens, and d5m is an inner diameter of an image-side surface of the fifth spacing element.

In an implementation, the plurality of spacing elements further comprise a fourth spacing element disposed between the fourth lens and the fifth lens and in contact with an image-side surface of the fourth lens and a fifth spacing element disposed between the fifth lens and the sixth lens and in contact with an image-side surface of the fifth lens, and the optical camera lens assembly satisfies: $1.0<(EP45+CT5)/(T45+CP5)<2.5$, where, EP45 is a spacing between the fourth spacing element and the fifth spacing element, CP5 is a maximum thickness of the fifth spacing element, CT5 is a center thickness of the fifth lens on the optical axis, and T45 is an air spacing between the fourth lens and the fifth lens on the optical axis.

In an implementation, the plurality of spacing elements further comprise a sixth spacing element disposed between the sixth lens and the seventh lens and in contact with an image-side surface of the sixth lens, and the optical camera lens assembly satisfies: $6.0<(EP56+CT6+CP6)/T56<8.0$, where, CT6 is a center thickness of the sixth lens on the optical axis, T56 is an air spacing between the fifth lens and the sixth lens on the optical axis, EP56 is a spacing between the fifth spacing element and the sixth spacing element, and CP6 is a maximum thickness of the sixth spacing element.

In an implementation, the optical camera lens assembly satisfies: ImgH>6.7 mm; Fno<1.7; and $2.0<\Sigma EP/\Sigma CP<4.5$, where $\Sigma CP$ is a sum of a maximum thickness of each spacing element in the plurality of spacing elements, ΣEP is a sum of spacing distances between two adjacent spacing elements in the plurality of spacing elements, ImgH is half of a diagonal length of an effective pixel area on an image plane of the optical camera lens assembly, and Fno is a relative F number of the optical camera lens assembly.

In the present disclosure, a seven-piece lens assembly architecture is used, and an effect of eliminating stray light may be achieved by controlling a ratio of a sum of the radius of curvature of the object-side surface of the second lens and the radius of curvature of the image-side surface of the second lens to a radius of the object-side surface of the third spacing element. Specifically, part of the light may produce internal reflection at the second lens when passing through the second lens. By reasonably adjusting the radius of curvature of the object-side surface of the second lens and the radius of curvature of the image-side surface of the second lens, the light that produces internal reflection at the second lens may pass through the third lens, and exit at an effective radius edge position on the image-side surface of the third lens. By reasonably controlling the inner diameter of the object-side surface of the third spacing element, it is possible to effectively intercept the light exiting from the effective radius edge position on the image-side surface of the third lens, so as to achieve the effect of eliminating stray light.

BRIEF DESCRIPTION OF THE DRAWINGS

Other features, objectives, and advantages of the present disclosure will become more apparent from the following detailed description of the non-limiting embodiments with reference to the accompanying drawings.

FIG. 4 illustrates a schematic structural diagram of another optical camera lens assembly according to Embodiment 1 of the present disclosure;

FIGS. 5A-5D respectively illustrate a longitudinal aberration curve, an astigmatic curve, a distortion curve and a lateral color curve of the optical camera lens assembly according to Embodiment 1 of the present disclosure;

FIG. 7 illustrates a schematic structural diagram of another optical camera lens assembly according to Embodiment 2 of the present disclosure;

FIGS. 8A-8D respectively illustrate a longitudinal aberration curve, an astigmatic curve, a distortion curve and a lateral color curve of the optical camera lens assembly according to Embodiment 2 of the present disclosure;

FIG. 9 illustrates a schematic structural diagram of an optical camera lens assembly according to Embodiment 3 of the present disclosure;

FIG. 10 illustrates a schematic structural diagram of another optical camera lens assembly according to Embodiment 3 of the present disclosure;

FIGS. 11A-11D respectively illustrate a longitudinal aberration curve, an astigmatic curve, a distortion curve and a lateral color curve of the optical camera lens assembly according to Embodiment 3 of the present disclosure;

FIG. 13 illustrates a schematic structural diagram of another optical camera lens assembly according to Embodiment 4 of the present disclosure; and FIGS. 14A-14D respectively illustrate a longitudinal aberration curve, an astigmatic curve, a distortion curve and a lateral color curve of the optical camera lens assembly according to Embodiment 4 of the present disclosure.

DETAILED DESCRIPTION OF EMBODIMENTS

Figure 1:
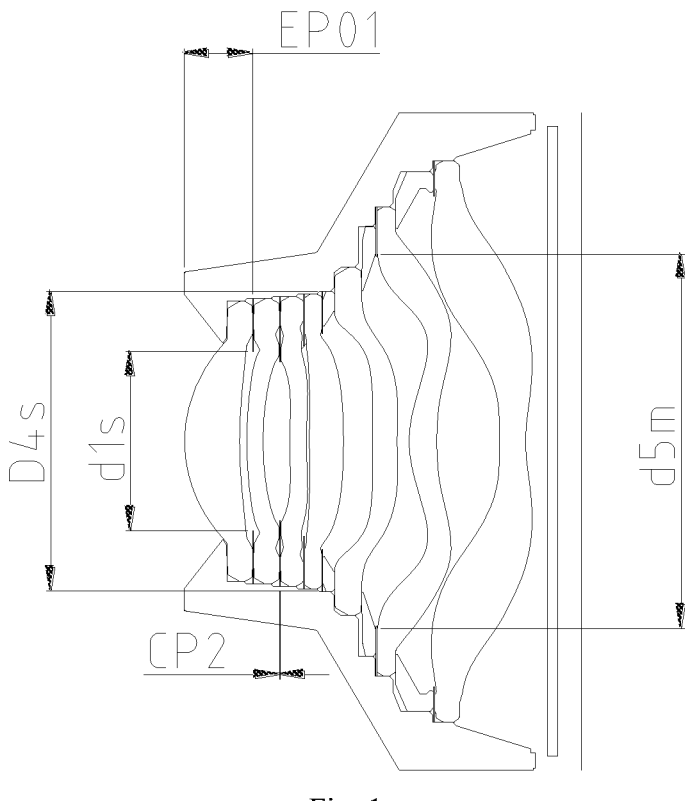
FIG. 1 illustrates a schematic diagram of parameter labeling of an optical camera lens assembly according to an embodiment of the present disclosure.

For a better understanding of the present disclosure, various aspects of the present disclosure will be described in more detail with reference to the accompanying drawings. It should be understood that the detailed description is merely an illustration for the exemplary implementations of the present disclosure, rather than a limitation to the scope of the present disclosure in any way. Throughout the specification, the same reference numerals designate the same elements. The expression "and/or" includes any and all combinations of one or more of the associated listed items.

It should be noted that, in the specification, the expressions such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses are slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, a paraxial area refers to an area near an optical axis. If a lens surface is a convex surface and the position of the convex surface is not defined, it represents that the lens surface is a convex surface at least at the paraxial area. If the lens surface is a concave surface and the position of the concave surface is not defined, it represents that the lens surface is a concave surface at least in the paraxial area. In each lens, a surface closest to a photographed object is referred to as the object-side surface of the lens, and a surface closest to an image plane is referred to as the image-side surface of the lens.

It should be further understood that the terms "comprise," "comprising," "having," "include" and/or "including," when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (e.g., those defined in commonly used dictionaries) should be interpreted as having a meaning that is consistent with their meaning in the context of the relevant art and will not be interpreted in an idealized or overly formal sense unless expressly so defined herein.

Features, principles and other aspects of the present disclosure are described below in detail.

An optical camera lens assembly according to exemplary implementations of the present disclosure may include a lens group and spacing elements. The lens group may include seven lenses having respective refractive powers. Along an optical axis from an object side to an image side, a first lens, a second lens, a third lens, a fourth lens, a fifth lens, a sixth lens, and a seventh lens are sequentially arranged. The spacing elements include a third spacing element, disposed between the third lens and the fourth lens and in direct contact with an image-side surface of the third lens. There may be an air spacing between any two adjacent lenses in the seven lenses from the first lens to the seventh lens.

In the exemplary implementations, the first lens, the fourth lens, and the sixth lens each may have a positive refractive power; and the second lens, the third lens, the fifth lens, and the seventh lens each may have a negative refractive power. By controlling the refractive powers of the optical camera lens assembly, it may be ensured that the optical camera lens assembly satisfies imaging requirements.

In the exemplary implementations, the optical camera lens assembly according to the present disclosure may satisfy: $3.0 < (R3+R4)/d3s < 5.0$, where, R3 is a radius of curvature of an object-side surface of the second lens, R4 is a radius of curvature of an image-side surface of the second lens, and d3s is an inner diameter of an object-side surface of the third spacing element. By controlling a ratio of a sum of the radius of curvature of the object-side surface of the second lens and the radius of curvature of the image-side surface of the second lens to a radius of the object-side surface of the third spacing element and by controlling a radius of curvature of the second lens, light that produces internal reflection in the lens when passing through the second lens may pass through the third lens and exit at an effective radius edge position of the third lens. By controlling the inner diameter of the object-side surface of the third spacing element, the light may hit on an surface of the third spacing element after exiting from the third lens, thereby blocking this light and achieving an effect of eliminating stray light. More specifically, the ratio of the sum of R3 and R4 to d3s may further satisfy: $3.2 < (R3+R4)/d3s < 4.8$.

In the exemplary implementations, the spacing elements in the optical camera lens assembly according to the present disclosure further include a first spacing element, disposed between the first lens and the second lens and in contact with an image-side surface of the first lens. The optical camera lens assembly may satisfy: $14.0 < (EP01+CT1)/T12 < 19.0$, where, EP01 is a distance from an object-side end surface of the lens barrel to the first spacing element, CT1 is a center thickness of the first lens on the optical axis, and T12 is an air spacing between the first lens and the second lens on the optical axis. By controlling a ratio of a sum of the distance from the object side of the optical camera lens assembly to the first spacing element and the center thickness CT1 of the first lens on the optical axis, to the air spacing between the first lens and the second lens on the optical axis to be within a reasonable range, an overall curvature of the first lens may be controlled, so that there is a space between the first lens and an effective radius edge of the second lens to avoid interference between the first lens and the second lens, and a mold processibility is comprehensively considered. Through this conditional formula, when the air spacing between the first lens and the second lens is fixed, the curvature and the center thickness of the first lens may be balanced, so that a contour shape of the first lens has a gradual uniformity, and the structure is better, which is conducive to molding. More specifically, the ratio of the sum of EP01 and CT1 to T12 further satisfies: $14.5 < (EP01+CT1)/T12 < 18.5$.

In the exemplary implementations, the spacing elements in the optical camera lens assembly according to the present disclosure further include a second spacing element, disposed between the second lens and the third lens and in contact with the image-side surface of the second lens. The optical camera lens assembly may satisfy: $38.0 < (d1s-d2s+CT2)/CP2 < 45.0$, where, CT2 is a center thickness of the second lens on the optical axis, d1s is an inner diameter of an object-side surface of the first spacing element, d2s is an inner diameter of an object-side surface of the second spacing element, and CP2 is a maximum thickness of the second spacing element. By controlling a ratio of a sum of an inner diameter difference between the object-side surface of the first spacing element and the object-side surface of the second spacing element and the center thickness CT2 of the second lens on the optical axis, to the maximum thickness CP2 of the second spacing element, combined with molding process needs of the lenses, the center thickness of the second lens may be effectively controlled to satisfy the molding needs, avoiding lens fracture during assembling due to a small center thickness of the second lens. Further, it is also possible to avoid a poor fluidity, which affects a strength, a surface type, etc. of the lens, during the molding due to a small center thickness of the lens, as well as to avoid a phenomenon of welding marks due to a large thickness-to-thinness ratio of the lens, thus improving lens molding and avoiding stray light caused by the presence of welding marks in advance. More specifically, the ratio of the sum of the difference between d1s and d2s and CT2, to CP2 further satisfies: $38.0 < (d1s-d2s+CT2)/CP2 < 44.8$.

In the exemplary implementations, the optical camera lens assembly according to the present disclosure may satisfy: $12.0 < (R5-R6)/(d3s-d2s) < 17.0$, where, d2s is the inner diameter of the object-side surface of the second spacing element, d3s is the inner diameter of the object-side surface of the third spacing element, R5 is a radius of curvature of an object-side surface of the third lens, and R6 is a radius of curvature of the image-side surface of the third lens. By reasonably setting a ratio of a difference between the radius of curvature of the object-side surface of the third lens and the radius of curvature of the image-side surface of the third lens, to an inner diameter difference between the object-side surface of the third spacing element and the object-side surface of the second spacing element, it is conducive to control a total deflection angle of an edge field-of-view on these two surfaces to be within a reasonable range, thereby effectively reducing a sensitivity of the system. By further controlling the inner diameter of the object-side surface of the second spacing element and the inner diameter of the object-side surface of the third spacing element, non-imaging stray light can be effectively intercepted, ensuring an imaging quality. More specifically, the ratio of the difference between R5 and R6 to the difference between d3s and d2s further satisfies: $12.5 < (R5-R6)/(d3s-d2s) < 17.0$.

In the exemplary implementations, the optical camera lens assembly according to the present disclosure may satisfy: $57.0 < (T23+EP23)/CP3 < 61.0$, where, T23 is an air spacing between the second lens and the third lens on the optical axis, CP3 is a maximum thickness of the third spacing element, and EP23 is a spacing between the second spacing element and the third spacing element. By controlling a ratio of a sum of the air spacing T23 between the second lens and the third lens on the optical axis and the spacing EP23 between the second spacing element and the third spacing element to the maximum thickness CP3 of the third spacing element, it is conducive to balancing an edge thickness of the third lens with the air spacing between the second lens and the third lens, which may effectively ensure the edge thickness of the third lens. When the thickness of the third spacing element increases, the air spacing between the second lens and the third lens on the optical axis increases, which may reduce an influence on the edge thickness of the third lens, so that the edge thickness of the third lens satisfies molding conditions, and edge position fracture during the lens molding and assembling due to a small edge thickness of the third lens may be avoided. More specifically, the ratio of the sum of T23 and EP23 to CP3 may further satisfy: $57.5 < (T23+EP23)/CP3 < 60.5$.

In the exemplary implementations, the optical camera lens assembly according to the present disclosure satisfies: $-5.5 < f3/D3s < -4.0$, where, f3 is an effective focal length of the third lens, and D3s is an outer diameter of the object-side surface of the third spacing element. By controlling a ratio of the effective focal length f3 of the third lens to the outer diameter D3s of the object-side surface of the third spacing element, after the first lens converges light, the third lens having a negative refractive power may appropriately diverge the light to ensure an effect of effective focal length increase. At the same time, a field curvature is corrected by the two lenses to achieve a good imaging effect, and reasonably controlling the outer diameter of the object-side surface of the third spacing element is conducive to ensuring an assembly stability. More specifically, the ratio of f3 to D3s further satisfies: $-5.4 < f3/D3s < -4.0$.

In the exemplary implementations, the spacing elements in the optical camera lens assembly according to the present disclosure further include a fourth spacing element disposed between the fourth lens and the fifth lens and in contact with an image-side surface of the fourth lens. The optical camera lens assembly satisfies: $1.0 < (R7+R8)/(D4s+d4s) < 5.0$, where, R7 is a radius of curvature of an object-side surface of the fourth lens, R8 is a radius of curvature of the image-side surface of the fourth lens, D4s is an outer diameter of an object-side surface of the fourth spacing element, and d4s is an inner diameter of the object-side surface of the fourth spacing element. By controlling a ratio of a sum of the radius of curvature of the object-side surface of the fourth lens and the radius of curvature of the image-side surface of the fourth lens to a sum of the inner diameter of the object-side surface of the fourth spacing element and the outer diameter of the object-side surface of the fourth spacing element, it may control curvatures of the object-side surface and the image-side surface of the fourth lens, reduce an overall bending degree of the fourth lens, make an overall structure of the lens smooth, and facilitate a material fluidity during the molding. It is also possible to avoid deterioration of the surface type caused by a change of the material fluidity during the molding because of overbending of the effective radius of the fourth lens, and also avoid large deformation during the assembling due to overbending of the overall lens. More specifically, the ratio of the sum of R7 and R8 to the sum of D4s and d4s may further satisfy: $1.3 < (R7+R8)/(D4s+d4s) < 4.5$.

In the exemplary implementations, the optical camera lens assembly according to the present disclosure satisfies: $1.0 < (CT4+T34)/(EP34+CP4) < 2.5$, where, CT4 is a center thickness of the fourth lens on the optical axis, T34 is an air spacing between the third lens and the fourth lens on the optical axis, EP34 is a spacing between the third spacing element and the fourth spacing element, and CP4 is a maximum thickness of the fourth spacing element. By controlling a ratio of a sum of the air spacing T34 of the third lens and the fourth lens on the optical axis and the center thickness CT4 of the fourth lens to a sum of the spacing EP34 between the third spacing element and the fourth spacing element and the maximum thickness CP4 of the fourth spacing element, it may effectively control a contour shape uniformity of the fourth lens, avoid molding process problems such as the center thickness and edge thickness of a lens being too large or too small to affect the surface type, the strength, the material fluidity of the lens, increasing a processing cost of the lens, and also avoid welding marks caused by an excessive thickness-to-thinness ratio of the fourth lens. In addition, it may also control a weight increase of the fourth lens caused by excessive thickness, increasing a material cost. Reasonably controlling the air spacing between the third lens and the fourth lens on the optical axis is conducive to improving a space utilization, making it better suitable for a size-constrained system. More specifically, the ratio of the sum of CT4 and T34 to the sum of EP34 and CP4 may further satisfy: $1.3 < (CT4+T34)/(EP34+CP4) < 2.1$.

In the exemplary implementations, the spacing elements in the optical camera lens assembly according to the present disclosure further include a fifth spacing element disposed between the fifth lens and the sixth lens and in contact with an image-side surface of the fifth lens. The optical camera lens assembly satisfies: $3.5<R9/d5m<5.5$, where, R9 is a radius of curvature of an object-side surface of the fifth lens, and d5m is an inner diameter of an image-side surface of the fifth spacing element. By controlling a ratio of the radius of curvature R9 of the object-side surface of the fifth lens to the inner diameter d5m of the image-side surface of the fifth spacing element, the radius of curvature of the object-side surface of the fifth lens may be controlled to prevent overbending, which results in an excessive edge thickness of the fifth lens and affects the molding, of the surface type of the object-side surface, and to avoid the risk of welding marks caused by an excessive thickness-to-thinness ratio. By controlling the inner diameter of the image-side surface of the fifth spacing element, it may avoid an excessive outer diameter of the fifth lens which forms a large segment difference with the fourth lens and affects assembling of the lens and ultimately affects an overall performance of the lens assembly. More specifically, the ratio of R9 to d5m may further satisfy: $3.6<R9/d5m<5.1$.

In the exemplary implementations, the optical camera lens assembly according to the present disclosure satisfies: $1.0<(EP45+CT5)/(T45+CP5)<2.5$, where, EP45 is a spacing between the fourth spacing element and the fifth spacing element, CP5 is a maximum thickness of the fifth spacing element, CT5 is a center thickness of the fifth lens on the optical axis, and T45 is an air spacing between the fourth lens and the fifth lens on the optical axis. By controlling a sum of the spacing EP45 between the fourth spacing element and the fifth spacing element and the center thickness CT5 of the fifth lens on the optical axis, and controlling a sum of the air spacing T45 between the fourth lens and the fifth lens on the optical axis and the maximum thickness CP5 of the fifth spacing element, an overall thickness uniformity of the fifth lens may be controlled, which is conducive to processing and molding of the fifth lens. At the same time, the thickness of the fifth spacing element may be ensured to avoid a large deformation occurs during compression of the assembly, due to the thickness of the fifth spacing element being too small and some positions failing to be filled or the structure failing to be molded during the molding. Further, a ratio of the sum of EP45 and CT5 to the sum of T45 and CP5 may satisfy: $1.2<(EP45+CT5)/(T45+CP5)<2.3$.

In the exemplary implementations, the spacing elements in the optical camera lens assembly according to the present disclosure further include a sixth spacing element disposed between the sixth lens and the seventh lens and in contact with an image-side surface of the sixth lens. The optical camera lens assembly satisfies: $6.0<(EP56+CT6+CP6)/T56<8.0$, where, CT6 is a center thickness of the sixth lens on the optical axis, T56 is an air spacing between the fifth lens and the sixth lens on the optical axis, EP56 is a spacing between the fifth spacing element and the sixth spacing element, and CP6 is a maximum thickness of the sixth spacing element. By controlling a ratio of a sum of the center thickness CT6 of the sixth lens on the optical axis, the maximum thickness CP6 of the sixth spacing element, and the spacing EP56 between the fifth spacing element and the sixth spacing element, to the air spacing T56 between the fifth lens and the sixth lens on the optical axis, the thickness of the sixth spacing element may be ensured. Due to a large segment difference between the sixth lens and the seventh lens, it avoids an insufficient overall strength and a large deformation during the assembling due to too small thickness of the sixth spacing element. At the same time, it may also control an overall lens thickness uniformity of the sixth lens to avoid an undesirable surface type caused in molding. It may also control the air spacing between the fifth lens and the sixth lens to ensure the thickness of the fifth spacing element and improve the assembly stability. More specifically, the ratio of the sum of EP56, CT6, and CP6 to T56 may further satisfy: $6.5<(EP56+CT6+CP6)/156<7.8$.

In the exemplary implementations, the optical camera lens assembly according to the present disclosure satisfies: $ImgH>6.7$ mm, $Fno<1.7$ and $2.0<\Sigma EP/\Sigma CP<4.5$, where, $\Sigma CP$ is a sum of a maximum thickness of each spacing element in the spacing elements, $\Sigma EP$ is a sum of spacing distances between two adjacent spacing elements in the spacing elements, ImgH is half of a diagonal length of an effective pixel area on an image plane of the optical camera lens assembly, and Fno is a relative F number of the optical camera lens assembly. When the system satisfies $ImgH>6.7$ mm and $Fno<1.7$, it may satisfy design requirements, and by further controlling $\Sigma CP$ and $\Sigma EP$ to satisfy $2.0<\Sigma EP/\Sigma CP<4.5$, it can improve the assembly stability of the optical camera lens assembly. More specifically, a ratio of $\Sigma EP$ to $\Sigma CP$ may further satisfy: $2.2<\Sigma EP/\Sigma CP<4.5$.

In the exemplary implementations, an effective focal length f1 of the first lens may be, for example, in a range of 6.5 mm to 8.5 mm, an effective focal length f2 of the second lens may be, for example, in a range of −50 mm to −22 mm, the effective focal length f3 of the third lens may be, for example, in a range of −35 mm to −22 mm, an effective focal length f4 of the fourth lens may be, for example, in a range of 15 mm to 25 mm, an effective focal length f5 of the fifth lens may be, for example, in a range of −22 mm to −14 mm, an effective focal length f6 of the sixth lens may be, for example, in a range of 5 mm to 7 mm, and an effective focal length f7 of the seventh lens may be, for example, in a range of −6 mm to −5 mm.

In the exemplary implementations, half of the diagonal length of the effective pixel area on the image plane of the optical camera lens assembly may be, for example, in a range of 6.7 mm to 7.0 mm, and the F number Fno of the optical camera lens assembly may be, for example, in a range of 1.5 to 1.7.

In the exemplary implementations, the optical camera lens assembly according to the present disclosure also includes a diaphragm. The diaphragm may be disposed between an object side and the first lens. Alternatively, the above optical camera lens assembly may further include an optical filter for correcting a color deviation and/or a protective glass for protecting a photosensitive element on the image plane.

The present disclosure proposes an optical camera lens assembly scheme, under the premise of a relatively large aperture, a small overall length and a small head size of the lens assembly may be realized. The optical camera lens assembly according to the above implementations of the present disclosure may apply a plurality of lenses, for example, the above seven lenses. By reasonably assigning the refractive powers, the surface types of the lenses, the center thicknesses of the lenses and the axial spacings between the lenses, etc., it may effectively converge incident light, reduce a total track length of the optical camera lens assembly and improve processability of the optical camera lens assembly, so that the optical camera lens assembly is more conducive to production and processing.

In the implementations of the present disclosure, at least one of the surfaces of the lenses is an aspheric surface. That is, at least one of the surfaces from the object-side surface of the first lens to the image-side surface of the seventh lens is an aspheric surface. The aspheric lens is characterized in that the curvature continuously changes from the center of the lens to the periphery of the lens. Different from a spherical lens having a constant curvature from the center of the lens to the periphery of the lens, the aspheric lens has a better radius-of-curvature characteristic, and has advantages of improving the distortion aberration and improving the astigmatic aberration. By using the aspheric lens, it is possible to eliminate as much as possible the aberrations that occur during imaging, thereby improving the imaging quality. Alternatively, at least one of the object-side surface and the image-side surface of each of the first lens, the second lens, the third lens, the fourth lens, the fifth lens, the sixth lens, and the seventh lens is an aspheric lens. Alternatively, the object-side surface and the image-side surface of each of the first lens, the second lens, the third lens, the fourth lens, the fifth lens, the sixth lens, and the seventh lens are aspheric surfaces.

However, it should be understood by those skilled in the art that various results and advantages described in the present specification may be obtained by changing the number of the lenses constituting the optical camera lens assembly without departing from the technical solution claimed by the present disclosure. For example, although the optical camera lens assembly having seven lenses is described as an example in the implementations, the optical camera lens assembly is not limited to including the seven lenses. If desired, the optical camera lens assembly may also include other numbers of lenses.

Figure 2:
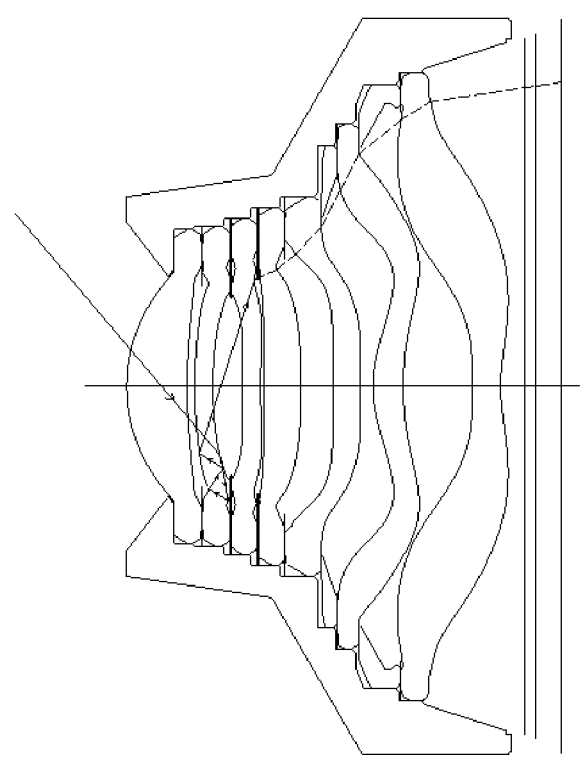
FIG. 2 illustrates a schematic diagram of a partial light trend of an optical camera lens assembly according to an embodiment of the present disclosure.

Specific embodiments of the optical camera lens assembly that may be applicable to the above implementations are further described below with reference to the accompanying drawings. FIG. 1 is a schematic structural diagram of an optical camera lens assembly according to an embodiment of the present disclosure, and a lens assembly part corresponding to structural parameters of each part of any optical camera lens assembly provided in Embodiment 1 to Embodiment 4 of the present disclosure may be shown with reference to FIG. 1. FIG. 2 illustrates a schematic diagram of a partial light trend of an optical camera lens assembly according to an embodiment of the present disclosure. As shown in FIG. 2, part of the light incident on the lens assembly forms stray light due to internal reflection at the second lens. By reasonably setting the radius of curvature of the object-side surface of the second lens and the radius of curvature of the image-side surface of the second lens and the inner diameter of the object-side surface of the third spacing element, it may effectively eliminate the stray light formed due to internal reflection at the second lens.

Embodiment 1

Figure 3:
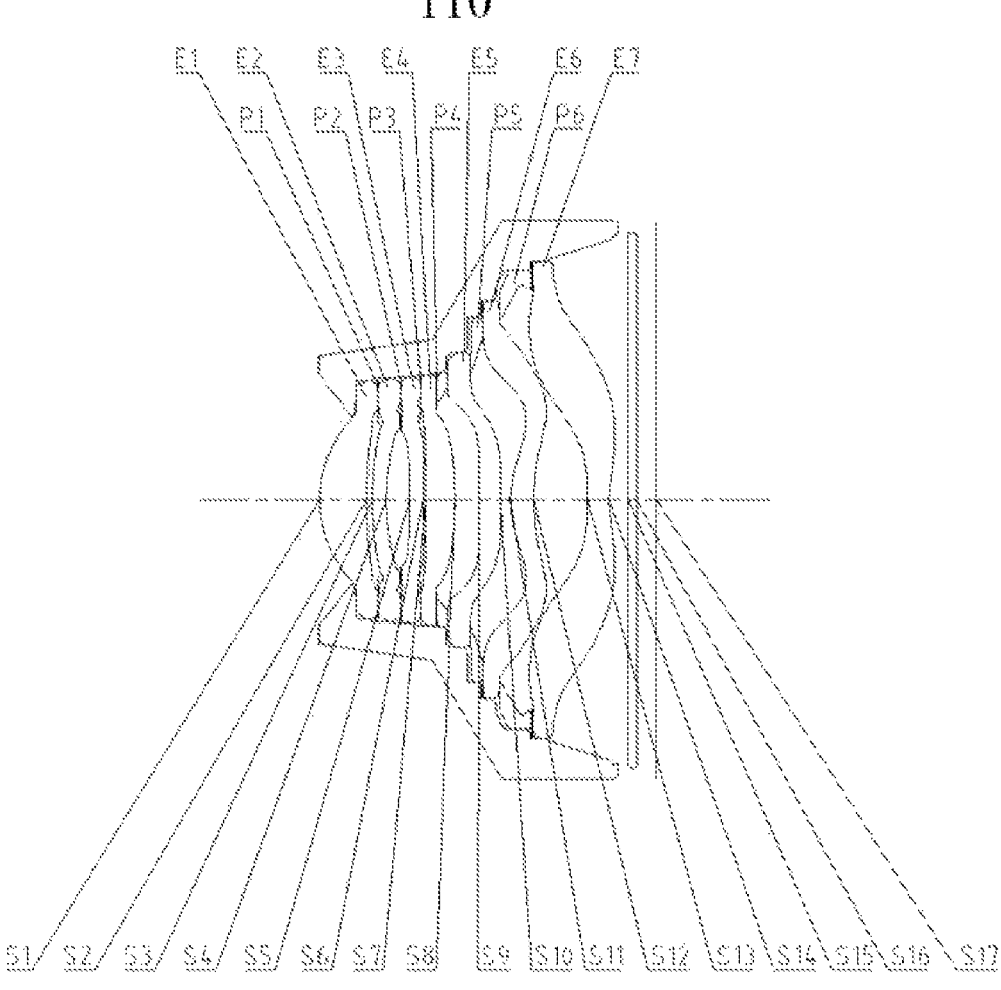
FIG. 3 illustrates a schematic structural diagram of an optical camera lens assembly according to Embodiment 1 of the present disclosure.

An optical camera lens assembly according to Embodiment 1 of the present disclosure is described below with reference to FIG. 3 to FIG. 5D. FIG. 3 to FIG. 4 respectively illustrate schematic structural diagrams of an optical camera lens assembly 110 and an optical camera lens assembly 120 according to Embodiment 1 of the present disclosure.

As shown in FIG. 3 to FIG. 4, the optical camera lens assembly 110 and the optical camera lens assembly 120 each may include a lens group, and the lens group, along an optical axis from an object side to an image side, sequentially includes: a diaphragm STO, a first lens E1, a second lens E2, a third lens E3, a fourth lens E4, a fifth lens E5, a sixth lens E6 and a seventh lens E7. Alternatively, the optical camera lens assembly 110 and the optical camera lens assembly 120 may also include an optical filter E8 and an image plane S17.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a concave surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object sequentially passes through the surfaces S1-S16 and finally forms an image on the image plane S17.

Table 1 shows a table of basic parameters of the optical camera lens assembly 110 and the optical camera lens assembly 120 in Embodiment 1. Here, the units of a radius of curvature, a thickness/distance and a focal length are all millimeters (mm).

TABLE 1

| surface number | surface type | radius of curvature | thickness/distance | material refractive index | abbe number | effective focal length | conic coefficient |
|---|---|---|---|---|---|---|---|
| OBJ | spherical | infinite | infinite | | | | |
| STO | spherical | infinite | −0.7931 | | | | |
| S1 | aspheric | 2.9031 | 1.1341 | 1.52 | 64.1 | 7.88 | 0.0000 |
| S2 | aspheric | 8.7132 | 0.1480 | | | | 0.0000 |
| S3 | aspheric | 7.3520 | 0.3350 | 1.69 | 17.7 | −41.91 | 0.0000 |
| S4 | aspheric | 5.7489 | 0.5615 | | | | 0.0000 |
| S5 | aspheric | 19.4024 | 0.3350 | 1.68 | 19.2 | −30.98 | 0.0000 |
| S6 | aspheric | 10.1265 | 0.0628 | | | | 0.0000 |
| S7 | aspheric | 58.8748 | 0.7038 | 1.55 | 55.9 | 20.06 | 0.0000 |
| S8 | aspheric | −13.3872 | 0.6053 | | | | 0.0000 |
| S9 | aspheric | 39.2850 | 0.5025 | 1.57 | 37.4 | −15.17 | 0.0000 |
| S10 | aspheric | 7.0549 | 0.2444 | | | | 0.0000 |
| S11 | aspheric | 2.1989 | 0.5737 | 1.55 | 55.9 | 5.66 | −1.0000 |

TABLE 1-continued

| surface number | surface type | radius of curvature | thickness/distance | material refractive index | abbe number | effective focal length | conic coefficient |
|---|---|---|---|---|---|---|---|
| S12 | aspheric | 6.9265 | 1.3000 | | | | 0.0000 |
| S13 | aspheric | −22.1545 | 0.5300 | 1.55 | 55.9 | −5.15 | 0.0000 |
| S14 | aspheric | 3.1826 | 0.4589 | | | | −1.0000 |
| S15 | spherical | infinite | 0.2100 | 1.54 | 55.7 | | |
| S16 | spherical | infinite | 0.4852 | | | | |
| S17 | spherical | infinite | | | | | |

In this example, half of a diagonal length of an effective pixel area on the image plane of each of the optical camera lens assembly 110 and the optical camera lens assembly 120 is 6.71 mm, and the aperture number Fno is 1.65.

In Embodiment 1, both the object-side surface and the image-side surface of any lens in lenses from the first lens E1 to the seventh lens E7 are aspheric surfaces, and the surface type x of each aspheric lens may be defined using, but not limited to, the following aspheric formula:

$$x = \frac{ch^2}{1 + \sqrt{1 - (k+1)c^2h^2}} + \sum A_i h^i. \tag{1}$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is a reciprocal of the radius of curvature R in Table 1 above); k is the conic coefficient; and Ai is a correction coefficient of an i-th order of the aspheric surface. Table 2-1 and table 2-2 below show the high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ applicable to the aspheric surfaces S1 to S14 in Embodiment 1.

TABLE 2-1

| surface number | A4 | A6 | A8 | A10 | A12 | A14 | A16 |
|---|---|---|---|---|---|---|---|
| S1 | −7.0568E−03 | −3.8438E−03 | −2.0183E−03 | −7.0649E−04 | −2.7682E−04 | −7.1316E−05 | −3.5119E−05 |
| S2 | −7.7743E−02 | 1.1363E−02 | −4.9496E−03 | 3.2145E−04 | −4.3757E−04 | 7.1212E−05 | −1.0206E−04 |
| S3 | −2.5485E−02 | 3.1817E−02 | −2.2158E−03 | 1.6781E−03 | −1.8832E−04 | 1.7363E−04 | −1.1867E−04 |
| S4 | 2.4603E−03 | 1.6305E−02 | −7.5588E−04 | 1.2590E−03 | 1.2318E−04 | 2.6662E−04 | −1.1886E−05 |
| S5 | −2.4466E−01 | −5.9501E−03 | 5.0925E−05 | 9.8183E−04 | 4.0713E−04 | 1.5614E−04 | 6.9060E−05 |
| S6 | −3.0895E−01 | 1.3205E−02 | 6.8550E−03 | 2.2757E−03 | 1.9068E−03 | 1.5290E−04 | −1.5346E−04 |
| S7 | −1.1025E−01 | 2.2545E−03 | 1.0227E−03 | 2.0317E−03 | 3.7336E−03 | 2.6695E−04 | −3.4205E−04 |
| S8 | −2.7944E−01 | −2.7609E−02 | −2.8106E−04 | 5.3712E−03 | 7.4582E−03 | 4.4577E−03 | 2.1416E−03 |
| S9 | −8.5424E−01 | −4.0977E−02 | 2.8935E−02 | 3.2999E−02 | 5.8830E−03 | 2.0534E−03 | −1.9311E−03 |
| S10 | −1.7847E+00 | 4.7476E−01 | −4.0587E−02 | 7.1125E−03 | −3.2228E−02 | 1.1506E−02 | 3.4948E−03 |
| S11 | −4.9162E+00 | 8.8779E−01 | 6.5427E−02 | −6.8632E−02 | −4.4177E−02 | 3.3819E−02 | 3.6895E−03 |
| S12 | −2.4116E+00 | 4.6236E−02 | 1.6542E−01 | −1.1195E−01 | 4.7158E−02 | −2.0183E−03 | 3.4554E−03 |
| S13 | −1.5043E+00 | 1.2415E+00 | −6.5561E−01 | 2.9564E−01 | −1.1240E−01 | 2.2462E−02 | −3.0935E−03 |
| S14 | −7.3390E+00 | 1.8601E+00 | −4.6976E−01 | 2.0276E−01 | −1.1289E−01 | 2.6563E−02 | −2.1926E−02 |

TABLE 2-2

| surface number | A18 | A20 | A22 | A24 | A26 | A28 | A30 |
|---|---|---|---|---|---|---|---|
| S1 | −2.2389E−05 | −3.8082E−06 | 2.5983E−06 | 0.0000E+00 | 0.0000E+00 | 0.0000E+00 | 0.0000E+00 |
| S2 | 5.0114E−05 | −3.4464E−05 | 3.8259E−05 | 0.0000E+00 | 0.0000E+00 | 0.0000E+00 | 0.0000E+00 |
| S3 | 8.0519E−05 | −4.6662E−05 | 2.6950E−05 | −1.5096E−05 | 9.8822E−06 | −5.8885E−06 | 1.0095E−05 |
| S4 | 8.2735E−05 | −3.4393E−06 | 2.6265E−05 | −5.7767E−06 | 5.2300E−06 | −4.9618E−06 | 3.5077E−06 |
| S5 | −6.4214E−06 | 2.1122E−05 | −1.5564E−05 | 1.9048E−05 | −7.7354E−06 | 8.1896E−06 | −2.3860E−06 |
| S6 | −1.4176E−04 | 9.3225E−05 | −9.6331E−05 | 2.8309E−06 | −2.5002E−05 | 2.0557E−05 | 3.3714E−06 |
| S7 | −1.2139E−04 | −2.5716E−05 | −1.7833E−04 | 3.1681E−05 | 2.5871E−05 | 1.1028E−05 | 2.3477E−06 |
| S8 | 6.6182E−04 | 2.2921E−04 | −1.1780E−04 | −8.5928E−05 | −1.3553E−04 | −5.0961E−05 | −5.0835E−05 |
| S9 | −1.2975E−03 | −7.8096E−04 | 7.9159E−05 | 2.1181E−04 | 1.0648E−04 | −2.4193E−05 | −5.0564E−05 |
| S10 | 7.7281E−04 | −2.2145E−03 | 3.2506E−05 | 2.5343E−04 | 2.6368E−04 | −1.1392E−04 | −4.2501E−05 |
| S11 | −4.6236E−03 | −4.5143E−03 | 2.8098E−03 | 6.8304E−04 | −9.8828E−05 | −6.0599E−04 | 2.2160E−04 |
| S12 | −5.2626E−03 | 1.2173E−03 | −5.3645E−05 | −9.3304E−04 | −4.0296E−04 | 5.0013E−05 | 4.2544E−04 |
| S13 | 2.3262E−03 | −5.8777E−03 | 4.0874E−03 | −1.6301E−03 | 6.4689E−04 | −2.3596E−04 | 2.8214E−04 |
| S14 | 1.7688E−02 | −8.1997E−03 | 1.4936E−03 | −1.4851E−03 | 1.6233E−03 | −6.2830E−04 | 6.1243E−04 |

As shown in FIG. 3, the optical camera lens assembly 110 may also include spacer elements and a lens barrel for accommodating the above optical lens group and the spacing elements. The spacing elements include, for example, a first spacing element P1 disposed between the first lens E1 and the second lens E2, a second spacing element P2 disposed between the second lens E2 and the third lens E3, a third spacing element P3 disposed between the third lens E3 and the fourth lens E4, a fourth spacing element P4 disposed between the fourth lens E4 and the fifth lens E5, a fifth spacing element P5 disposed between the fifth lens E5 and the sixth lens E6, and a sixth spacing element P6 disposed between the sixth lens E6 and the seventh lens E7.

As shown in FIG. 4, the optical camera lens assembly 120 may also include spacer elements and a lens barrel for accommodating the above optical lens group and the spacing elements. The spacing elements include, for example, a first spacing element P1 disposed between the first lens E1 and the second lens E2, a second spacing element P2 disposed between the second lens E2 and the third lens E3, a third spacing element P3 disposed between the third lens E3 and the fourth lens E4, a fourth spacing element P4 disposed between the fourth lens E4 and the fifth lens E5, a fifth spacing element P5 disposed between the fifth lens E5 and the sixth lens E6, and a sixth spacing element P6 disposed between the sixth lens E6 and the seventh lens E7.

In the exemplary implementations, the first spacing element P1 may be in contact with the image-side surface of the first lens E1, the second spacing element P2 may be in contact with the image-side surface of the second lens E2, the third spacing element P3 may be in contact with the image-side surface of the third lens E3, the fourth spacing element P4 may be in contact with the image-side surface of the fourth lens E4, the fifth spacing element P5 may be in contact with the image-side surface of the fifth lens E5, and the sixth spacing element P6 may be in contact with the image-side surface of the sixth lens E6.

Figure 5C:
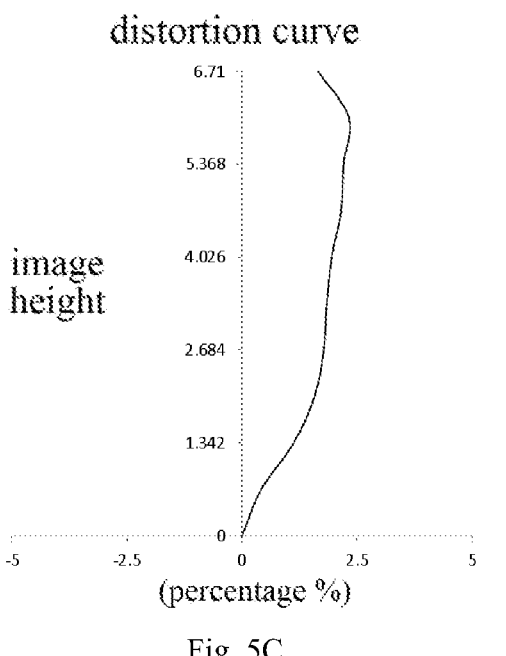
Figure 5D:
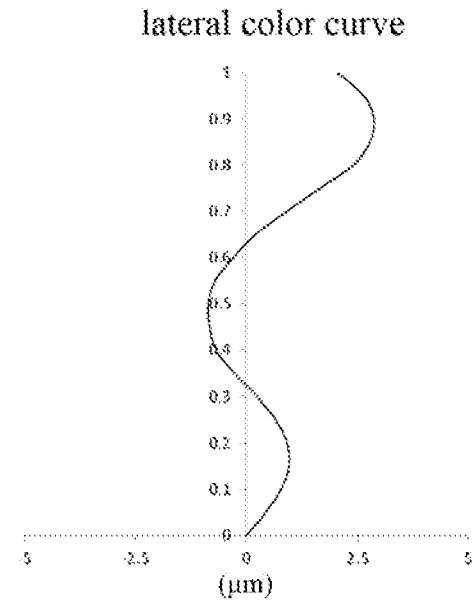

FIG. 5A illustrates a longitudinal aberration curve of the optical camera lens assembly according to Embodiment 1, representing deviations of focal points converged by light of different wavelengths which passes through the lens assembly. FIG. 5B illustrates an astigmatic curve of the optical camera lens assembly according to Embodiment 1, representing a curvature of a tangential image plane and a curvature of a sagittal image plane. FIG. 5C illustrates a distortion curve of the optical camera lens assembly according to Embodiment 1, representing amounts of distortion corresponding to different image heights. FIG. 5D illustrates a lateral color curve of the optical camera lens assembly according to Embodiment 1, representing deviations of different image heights on the image plane formed by light passing through the lens assembly. It can be seen from FIGS. 5A-5D that the optical camera lens assembly given in Embodiment 1 can achieve a good imaging quality.

Embodiment 2

Figure 6:
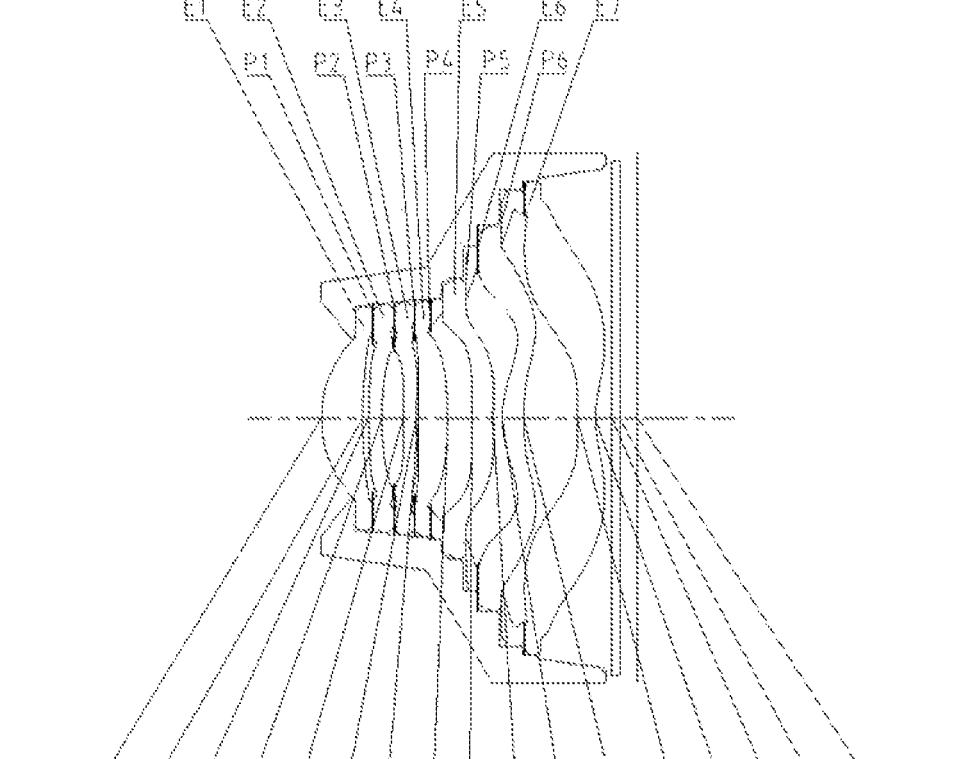
FIG. 6 illustrates a schematic structural diagram of an optical camera lens assembly according to Embodiment 2 of the present disclosure.

An optical camera lens assembly according to Embodiment 2 of the present disclosure is described below with reference to FIG. 6 to FIG. 8D. FIG. 6 to FIG. 7 respectively illustrate schematic structural diagrams of an optical camera lens assembly 210 and an optical camera lens assembly 220 according to Embodiment 2 of the present disclosure.

As shown in FIG. 6 to FIG. 7, the optical camera lens assembly 210 and the optical camera lens assembly 220 each may each include a lens group, and the lens group, along an optical axis from an object side to an image side, sequentially includes: a diaphragm STO, a first lens E1, a second lens E2, a third lens E3, a fourth lens E4, a fifth lens E5, a sixth lens E6 and a seventh lens E7. Alternatively, the optical camera lens assembly 210 and the optical camera lens assembly 220 may also include an optical filter E8 and an image plane S17.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a concave surface. The seventh lens E7 has a negative refractive power, an object-side surface S13 of the seventh lens E7 is a convex surface, and an image-side surface S14 of the seventh lens E7 is a concave surface. The optical filter E8 has an object-side surface S15 and an image-side surface S16. Light from an object sequentially passes through the surfaces S1-S16 and finally forms an image on the image plane S17.

In this example, half of a diagonal length of an effective pixel area on the image plane of each of the optical camera lens assembly 210 and the optical camera lens assembly 220 is 6.78 mm, and the aperture number Fno is 1.60.

Table 3 shows a table of basic parameters of the optical camera lens assembly 210 and the optical camera lens assembly 220 in Embodiment 2. Here, the units of a radius of curvature, a thickness/distance and a focal length are all millimeters (mm). Table 4-1 and table 4-2 show the high-order coefficients applicable to the aspheric surfaces in Embodiment 2. Here, the surface type of each aspheric surface may be defined using the formula (1) given in Embodiment 1.

TABLE 3

| surface number | surface type | radius of curvature | thickness/distance | material refractive index | abbe number | effective focal length | conic coefficient |
|---|---|---|---|---|---|---|---|
| OBJ | spherical | infinite | | | | | |
| STO | spherical | infinite | −0.7984 | | | | |
| S1 | aspheric | 2.9325 | 1.0695 | 1.52 | 64.1 | 7.71 | 0.0000 |

TABLE 3-continued

| surface number | surface type | radius of curvature | thickness/distance | material refractive index | material abbe number | effective focal length | conic coefficient |
|---|---|---|---|---|---|---|---|
| S2 | aspheric | 9.6549 | 0.1540 | | | | 0.0000 |
| S3 | aspheric | 10.8231 | 0.3449 | 1.69 | 17.7 | −35.96 | 0.0000 |
| S4 | aspheric | 7.4303 | 0.5532 | | | | 0.0000 |
| S5 | aspheric | 17.7073 | 0.3363 | 1.68 | 19.2 | −31.05 | 0.0000 |
| S6 | aspheric | 9.5371 | 0.0592 | | | | 0.0000 |
| S7 | aspheric | 38.0604 | 0.7546 | 1.55 | 55.9 | 18.39 | 0.0000 |
| S8 | aspheric | −13.5374 | 0.6279 | | | | 0.0000 |
| S9 | aspheric | 29.2492 | 0.5408 | 1.57 | 37.4 | −16.06 | 0.0000 |
| S10 | aspheric | 6.9260 | 0.2337 | | | | 0.0000 |
| S11 | aspheric | 2.4419 | 0.5582 | 1.55 | 55.9 | 5.98 | −1.0000 |
| S12 | aspheric | 8.9378 | 1.3888 | | | | 0.0000 |
| S13 | aspheric | 19.7115 | 0.4721 | 1.55 | 55.9 | −5.67 | 0.0000 |
| S14 | aspheric | 2.6116 | 0.4302 | | | | −1.0000 |
| S15 | spherical | infinite | 0.2100 | 1.54 | 55.7 | | |
| S16 | spherical | infinite | 0.4568 | | | | |
| S17 | spherical | infinite | | | | | |

TABLE 4-1

| surface number | A4 | A6 | A8 | A10 | A12 | A14 | A16 |
|---|---|---|---|---|---|---|---|
| S1 | 3.5652E−03 | −3.3882E−03 | −2.4973E−03 | −8.8856E−04 | −2.6695E−04 | −5.8700E−05 | −2.0884E−05 |
| S2 | −7.1235E−02 | 8.1438E−03 | −2.8447E−03 | −1.4207E−04 | −4.1849E−04 | −2.0698E−04 | −3.5112E−05 |
| S3 | −1.6185E−02 | 2.4628E−02 | 4.3829E−04 | 1.3674E−03 | 1.5244E−04 | 6.9042E−06 | −2.8620E−05 |
| S4 | 1.4599E−02 | 1.2351E−02 | 5.2721E−04 | 9.8433E−04 | 3.5084E−04 | 1.3293E−04 | 5.6230E−05 |
| S5 | −2.4337E−01 | −7.3692E−03 | 5.6555E−04 | 1.2117E−03 | 3.2101E−04 | 1.6949E−04 | 2.2417E−05 |
| S6 | −3.1286E−01 | 1.3957E−02 | 6.4665E−03 | 2.9925E−03 | 1.2768E−03 | 2.9496E−04 | −1.6215E−04 |
| S7 | −1.1688E−01 | 7.8891E−03 | −9.7829E−04 | 2.8304E−03 | 2.8199E−03 | 5.6666E−04 | −2.3027E−04 |
| S8 | −3.0645E−01 | −2.1325E−02 | −2.3947E−03 | 5.9603E−03 | 7.1831E−03 | 4.6037E−03 | 2.1715E−03 |
| S9 | −9.1414E−01 | −3.5191E−02 | 2.9598E−02 | 3.2538E−02 | 5.4363E−03 | 1.9079E−03 | −1.5968E−03 |
| S10 | −1.7934E+00 | 4.6442E−01 | −3.4260E−02 | 6.0196E−03 | −3.1105E−02 | 1.0514E−02 | 3.7272E−03 |
| S11 | −4.6840E+00 | 8.1814E−01 | 9.3969E−02 | −7.3194E−02 | −4.5164E−02 | 3.2714E−02 | 3.2158E−03 |
| S12 | −1.7795E+00 | −3.7863E−02 | 1.9018E−01 | −1.2102E−01 | 5.0642E−02 | −3.5221E−03 | 3.4037E−03 |
| S13 | −3.0631E+00 | 1.6000E+00 | −7.8290E−01 | 3.3115E−01 | −1.1083E−01 | 1.8908E−02 | −1.2068E−03 |
| S14 | −8.4474E+00 | 1.9346E+00 | −5.2558E−01 | 2.1811E−01 | −1.0643E−01 | 3.8336E−02 | −2.7729E−02 |

40

TABLE 4-2

| surface number | A18 | A20 | A22 | A24 | A26 | A28 | A30 |
|---|---|---|---|---|---|---|---|
| S1 | −1.6090E−06 | −1.0413E−06 | 4.3780E−06 | 0.0000E+00 | 0.0000E+00 | 0.0000E+00 | 0.0000E+00 |
| S2 | 4.5994E−05 | 4.4199E−05 | 1.8464E−05 | 0.0000E+00 | 0.0000E+00 | 0.0000E+00 | 0.0000E+00 |
| S3 | −1.6304E−06 | −6.0931E−06 | 4.0879E−06 | −7.1828E−06 | −1.4728E−06 | −1.2763E−06 | 4.9264E−06 |
| S4 | 2.0987E−05 | 9.1454E−06 | 3.4018E−06 | 2.1830E−06 | 8.9331E−08 | 1.1737E−06 | −1.4206E−07 |
| S5 | 2.1118E−05 | −5.8721E−06 | 7.5969E−06 | −1.9593E−06 | 4.7538E−06 | −2.0755E−06 | −6.6203E−08 |
| S6 | −3.2835E−05 | −2.0739E−06 | −3.1344E−05 | −9.4797E−06 | −4.9600E−07 | 3.0995E−06 | −2.1706E−06 |
| S7 | −3.8848E−05 | −9.9096E−05 | −9.3244E−05 | −8.3606E−07 | 1.5472E−05 | 7.3692E−06 | 4.3261E−06 |
| S8 | 8.0192E−04 | 2.2452E−04 | −8.0712E−05 | −1.2066E−04 | −1.2597E−04 | −6.1166E−05 | −4.0486E−05 |
| S9 | −1.2065E−04 | −7.7526E−04 | −5.4629E−05 | 1.6268E−04 | 1.3090E−04 | 1.7744E−05 | −2.7944E−06 |
| S10 | 3.7602E−04 | −1.9410E−03 | −1.0812E−04 | 3.8352E−04 | 1.9275E−04 | −9.8925E−05 | −5.2224E−05 |
| S11 | −5.0804E−03 | −2.3566E−03 | 2.2258E−03 | 1.1384E−04 | −4.7718E−04 | −8.1208E−05 | 2.0588E−04 |
| S12 | −5.7434E−03 | 1.8132E−03 | −5.4811E−04 | −1.5448E−04 | −3.1717E−04 | 2.1891E−04 | 7.3593E−05 |
| S13 | 2.8335E−03 | −5.4270E−03 | 3.2817E−03 | −1.0861E−03 | −1.5920E−04 | 2.5458E−04 | −1.1015E−04 |
| S14 | 1.4733E−02 | −3.3896E−03 | 9.7659E−04 | −2.1145E−03 | 9.5732E−04 | −1.2204E−04 | −5.5981E−05 |

60

As shown in FIG. 6, the optical camera lens assembly 210 may also include spacer elements and a lens barrel for accommodating the above optical lens group and the spacing elements. The spacing elements include, for example, a first spacing element P1 disposed between the first lens E1 and the second lens E2, a second spacing element P2 disposed between the second lens E2 and the third lens E3, a third spacing element P3 disposed between the third lens E3 and the fourth lens E4, a fourth spacing element P4 disposed between the fourth lens E4 and the fifth lens E5, a fifth spacing element P5 disposed between the fifth lens E5 and the sixth lens E6, and a sixth spacing element P6 disposed between the sixth lens E6 and the seventh lens E7.

As shown in FIG. 7, the optical camera lens assembly 220 may also include spacer elements and a lens barrel for accommodating the above optical lens group and the spacing elements. The spacing elements include, for example, a first spacing element P1 disposed between the first lens E1 and the second lens E2, a second spacing element P2 disposed between the second lens E2 and the third lens E3, a third spacing element P3 disposed between the third lens E3 and the fourth lens E4, a fourth spacing element P4 disposed between the fourth lens E4 and the fifth lens E5, a fifth spacing element P5 disposed between the fifth lens E5 and the sixth lens E6, and a sixth spacing element P6 disposed between the sixth lens E6 and the seventh lens E7.

In the exemplary implementations, the first spacing element P1 may be in contact with the image-side surface of the first lens E1, the second spacing element P2 may be in contact with the image-side surface of the second lens E2, the third spacing element P3 may be in contact with the image-side surface of the third lens E3, the fourth spacing element P4 may be in contact with the image-side surface of the fourth lens E4, the fifth spacing element P5 may be in contact with the image-side surface of the fifth lens E5, and the sixth spacing element P6 may be in contact with the image-side surface of the sixth lens E6.

FIG. 8A illustrates a longitudinal aberration curve of the optical camera lens assembly according to Embodiment 2, representing deviations of focal points converged by light of different wavelengths which passes through the lens assembly. FIG. 8B illustrates an astigmatic curve of the optical camera lens assembly according to Embodiment 2, representing a curvature of a tangential image plane and a curvature of a sagittal image plane. FIG. 8C illustrates a distortion curve of the optical camera lens assembly according to Embodiment 2, representing amounts of distortion corresponding to different image heights. FIG. 8D illustrates a lateral color curve of the optical camera lens assembly according to Embodiment 2, representing deviations of different image heights on the image plane formed by light passing through the lens assembly. It can be seen from FIGS. 8A-8D that the optical camera lens assembly given in Embodiment 2 can achieve a good imaging quality.

Embodiment 3

An optical camera lens assembly according to Embodiment 3 of the present disclosure is described below with reference to FIG. 9 to FIG. 11D. FIG. 9 to FIG. 10 respectively illustrate schematic structural diagrams of an optical camera lens assembly 310 and an optical camera lens assembly 320 according to Embodiment 3 of the present disclosure.

As shown in FIG. 9 to FIG. 10, the optical camera lens assembly 310 and the optical camera lens assembly 320 each may each include a lens group, and the lens group, along an optical axis from an object side to an image side, sequentially includes: a diaphragm STO, a first lens E1, a second lens E2, a third lens E3, a fourth lens E4, a fifth lens E5, a sixth lens E6 and a seventh lens E7. Alternatively, the optical camera lens assembly 310 and the optical camera lens assembly 320 may also include an optical filter E8 and an image plane S17.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a concave surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object sequentially passes through the surfaces S1-S16 and finally forms an image on the image plane S17.

In this example, half of a diagonal length of an effective pixel area on the image plane of each of the optical camera lens assembly 310 and the optical camera lens assembly 320 is 6.71 mm, and the aperture number Fno is 1.65.

Table 5 shows a table of basic parameters of the optical camera lens assembly 310 and the optical camera lens assembly 320 in Embodiment 3. Here, the units of a radius of curvature, a thickness/distance and a focal length are all millimeters (mm). Table 6-1 and table 6-2 show the high-order coefficients applicable to the aspheric surfaces in Embodiment 3. Here, the surface type of each aspheric surface may be defined using the formula (1) given in Embodiment 1.

TABLE 5

| surface number | surface type | radius of curvature | thickness/distance | material refractive index | abbe number | effective focal length | conic coefficient |
|---|---|---|---|---|---|---|---|
| OBJ | spherical | infinite | infinite | | | | |
| STO | spherical | infinite | −0.7570 | | | | |
| S1 | aspheric | 2.9176 | 1.0154 | 1.52 | 64.1 | 8.13 | 0.0000 |
| S2 | aspheric | 8.3790 | 0.1566 | | | | 0.0000 |
| S3 | aspheric | 10.1236 | 0.3158 | 1.69 | 17.7 | −47.96 | 0.0000 |
| S4 | aspheric | 7.6472 | 0.5405 | | | | 0.0000 |
| S5 | aspheric | 17.0940 | 0.3229 | 1.68 | 19.2 | −25.82 | 0.0000 |
| S6 | aspheric | 8.5757 | 0.0581 | | | | 0.0000 |
| S7 | aspheric | 28.9444 | 0.7450 | 1.55 | 55.9 | 16.88 | 0.0000 |
| S8 | aspheric | −13.3873 | 0.6128 | | | | 0.0000 |
| S9 | aspheric | 29.9164 | 0.5407 | 1.57 | 37.4 | −20.66 | 0.0000 |

TABLE 5-continued

| surface number | surface type | radius of curvature | thickness/distance | material refractive index | material abbe number | effective focal length | conic coefficient |
|---|---|---|---|---|---|---|---|
| S10 | aspheric | 8.3943 | 0.2678 | | | | 0.0000 |
| S11 | aspheric | 2.4845 | 0.5798 | 1.55 | 55.9 | 6.37 | −1.0000 |
| S12 | aspheric | 7.9784 | 1.4054 | | | | 0.0000 |
| S13 | aspheric | −52.1551 | 0.5468 | 1.55 | 55.9 | −5.41 | 0.0000 |
| S14 | aspheric | 3.0841 | 0.4231 | | | | −1.0000 |
| S15 | spherical | infinite | 0.2100 | 1.54 | 55.7 | | |
| S16 | spherical | infinite | 0.4494 | | | | |
| S17 | spherical | infinite | | | | | |

TABLE 6-1

| surface number | A4 | A6 | A8 | A10 | A12 | A14 | A16 |
|---|---|---|---|---|---|---|---|
| S1 | 4.3985E−03 | −3.2792E−03 | −2.4190E−03 | −9.4071E−04 | −2.9459E−04 | −7.7355E−05 | −9.3006E−06 |
| S2 | −7.4991E−02 | 8.8666E−03 | −2.8035E−03 | −3.4396E−04 | −3.5075E−04 | −1.8343E−04 | −2.6209E−05 |
| S3 | −2.0344E−02 | 2.6562E−02 | 9.4942E−05 | 1.3403E−03 | 1.8706E−04 | −5.4416E−06 | −4.1281E−05 |
| S4 | 1.0589E−02 | 1.3250E−02 | 7.0578E−05 | 1.0024E−03 | 3.7990E−04 | 1.4475E−04 | 6.1045E−05 |
| S5 | −2.4744E−01 | −5.6654E−03 | 9.9954E−05 | 1.1905E−03 | 3.4833E−04 | 1.9604E−04 | 2.9654E−05 |
| S6 | −3.1091E−01 | 1.5072E−02 | 5.7363E−03 | 3.3539E−03 | 1.0872E−03 | 3.2500E−04 | −1.8325E−04 |
| S7 | −1.0990E−01 | 4.3966E−03 | −4.5792E−05 | 3.1215E−03 | 2.4339E−03 | 6.2896E−04 | −2.4545E−04 |
| S8 | −2.9240E−01 | −2.1783E−02 | −2.0786E−03 | 5.8123E−03 | 6.9149E−03 | 4.5933E−03 | 2.1962E−03 |
| S9 | −8.8777E−01 | −3.3324E−02 | 2.7801E−02 | 3.2224E−02 | 5.6771E−03 | 2.1350E−03 | −1.4862E−03 |
| S10 | −1.6633E+00 | 4.3833E−01 | −2.3015E−02 | 1.3255E−03 | −3.0522E−02 | 9.8561E−03 | 4.6154E−03 |
| S11 | −4.5172E+00 | 7.8564E−01 | 9.7620E−02 | −7.3743E−02 | −4.3286E−02 | 3.1608E−02 | 3.7140E−03 |
| S12 | −2.0021E+00 | 3.7208E−03 | 1.6767E−01 | −1.0797E−01 | 4.3731E−02 | −8.0388E−04 | 3.1516E−03 |
| S13 | −1.9428E+00 | 1.3134E+00 | −6.6958E−01 | 2.8425E−01 | −9.1894E−02 | 1.0179E−02 | 3.3801E−03 |
| S14 | −7.3596E+00 | 1.6488E+00 | −4.0083E−01 | 1.7029E−01 | −7.7874E−02 | 2.1774E−02 | −2.0895E−02 |

TABLE 6-2

| surface number | A18 | A20 | A22 | A24 | A26 | A28 | A30 |
|---|---|---|---|---|---|---|---|
| S1 | 6.2260E−06 | 1.1744E−05 | 7.6668E−06 | 0.0000E+00 | 0.0000E+00 | 0.0000E+00 | 0.0000E+00 |
| S2 | 4.4385E−05 | 3.7317E−05 | 1.3981E−05 | 0.0000E+00 | 0.0000E+00 | 0.0000E+00 | 0.0000E+00 |
| S3 | −1.2729E−05 | −2.0620E−05 | −7.0946E−06 | −1.7431E−05 | −5.5306E−06 | −1.3516E−06 | 7.3689E−06 |
| S4 | 2.6866E−05 | 1.1598E−05 | 6.0040E−06 | 3.9015E−07 | 3.1978E−07 | 6.3381E−07 | −1.6353E−06 |
| S5 | 2.2839E−05 | −5.2211E−06 | 1.0562E−05 | −1.4320E−06 | 4.2485E−06 | −3.2535E−06 | 3.9609E−07 |
| S6 | −4.6517E−05 | −1.6086E−05 | −1.8039E−05 | −1.3326E−05 | −1.8915E−07 | −3.2364E−07 | −1.7028E−06 |
| S7 | −7.2349E−05 | −8.5150E−05 | −7.4338E−05 | −7.6023E−06 | 1.5749E−05 | 8.0268E−06 | 3.0302E−06 |
| S8 | 8.0151E−04 | 2.2950E−04 | −7.6946E−05 | −1.1755E−04 | −1.3161E−04 | −6.4001E−05 | −4.4494E−05 |
| S9 | −1.3317E−03 | −9.3482E−04 | −1.1671E−04 | 1.7077E−04 | 1.7081E−04 | 3.6939E−05 | 2.7219E−04 |
| S10 | 2.3137E−04 | −2.0932E−03 | −1.8882E−04 | 4.4997E−04 | 2.2204E−04 | −9.5029E−05 | −6.7779E−05 |
| S11 | −5.8563E−03 | −1.8601E−03 | 2.1560E−03 | 2.4213E−04 | −4.0660E−04 | −1.4333E−04 | 1.2644E−04 |
| S12 | −5.8857E−03 | 1.8176E−03 | −5.3271E−04 | −6.7744E−05 | −3.4689E−04 | 1.1348E−04 | 8.3979E−05 |
| S13 | −1.0099E−03 | −2.4275E−03 | 1.6944E−03 | −8.8725E−04 | 2.0214E−04 | −1.0847E−04 | 2.7157E−05 |
| S14 | 1.0428E−02 | −1.3890E−03 | 2.0562E−04 | −1.8194E−03 | 8.2237E−04 | −7.4592E−05 | −1.2135E−05 |

As shown in FIG. 9, the optical camera lens assembly 310 may also include spacer elements and a lens barrel for accommodating the above optical lens group and the spacing elements. The spacing elements include, for example, a first spacing element P1 disposed between the first lens E1 and the second lens E2, a second spacing element P2 disposed between the second lens E2 and the third lens E3, a third spacing element P3 disposed between the third lens E3 and the fourth lens E4, a fourth spacing element P4 disposed between the fourth lens E4 and the fifth lens E5, a fifth spacing element P5 disposed between the fifth lens E5 and the sixth lens E6, and a sixth spacing element P6 disposed between the sixth lens E6 and the seventh lens E7.

As shown in FIG. 10, the optical camera lens assembly 320 may also include spacer elements and a lens barrel for accommodating the above optical lens group and the spacing elements. The spacing elements include, for example, a first spacing element P1 disposed between the first lens E1 and the second lens E2, a second spacing element P2 disposed between the second lens E2 and the third lens E3, a third spacing element P3 disposed between the third lens E3 and the fourth lens E4, a fourth spacing element P4 disposed between the fourth lens E4 and the fifth lens E5, a fifth spacing element P5 disposed between the fifth lens E5 and the sixth lens E6, and a sixth spacing element P6 disposed between the sixth lens E6 and the seventh lens E7.

In the exemplary implementations, the first spacing element P1 may be in contact with the image-side surface of the first lens E1, the second spacing element P2 may be in contact with the image-side surface of the second lens E2, the third spacing element P3 may be in contact with the image-side surface of the third lens E3, the fourth spacing element P4 may be in contact with the image-side surface of the fourth lens E4, the fifth spacing element P5 may be in contact with the image-side surface of the fifth lens E5, and the sixth spacing element P6 may be in contact with the image-side surface of the sixth lens E6.

Figure 11C:
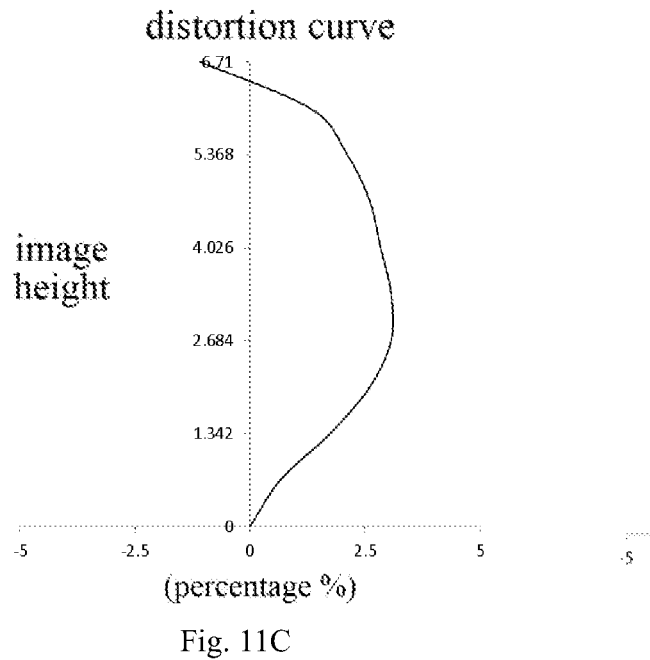
Figure 11D:
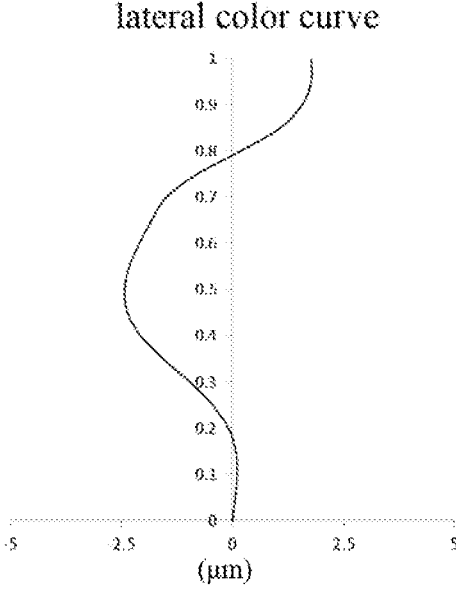

FIG. 11A illustrates a longitudinal aberration curve of the optical camera lens assembly according to Embodiment 3, representing deviations of focal points converged by light of different wavelengths which passes through the lens assembly. FIG. 11B illustrates an astigmatic curve of the optical camera lens assembly according to Embodiment 3, representing a curvature of a tangential image plane and a curvature of a sagittal image plane. FIG. 11C illustrates a distortion curve of the optical camera lens assembly according to Embodiment 3, representing amounts of distortion corresponding to different image heights. FIG. 11D illustrates a lateral color curve of the optical camera lens assembly according to Embodiment 3, representing deviations of different image heights on the image plane formed by light passing through the lens assembly. It can be seen from FIGS. 11A-11D that the optical camera lens assembly given in Embodiment 3 can achieve a good imaging quality.

Embodiment 4

Figure 12:
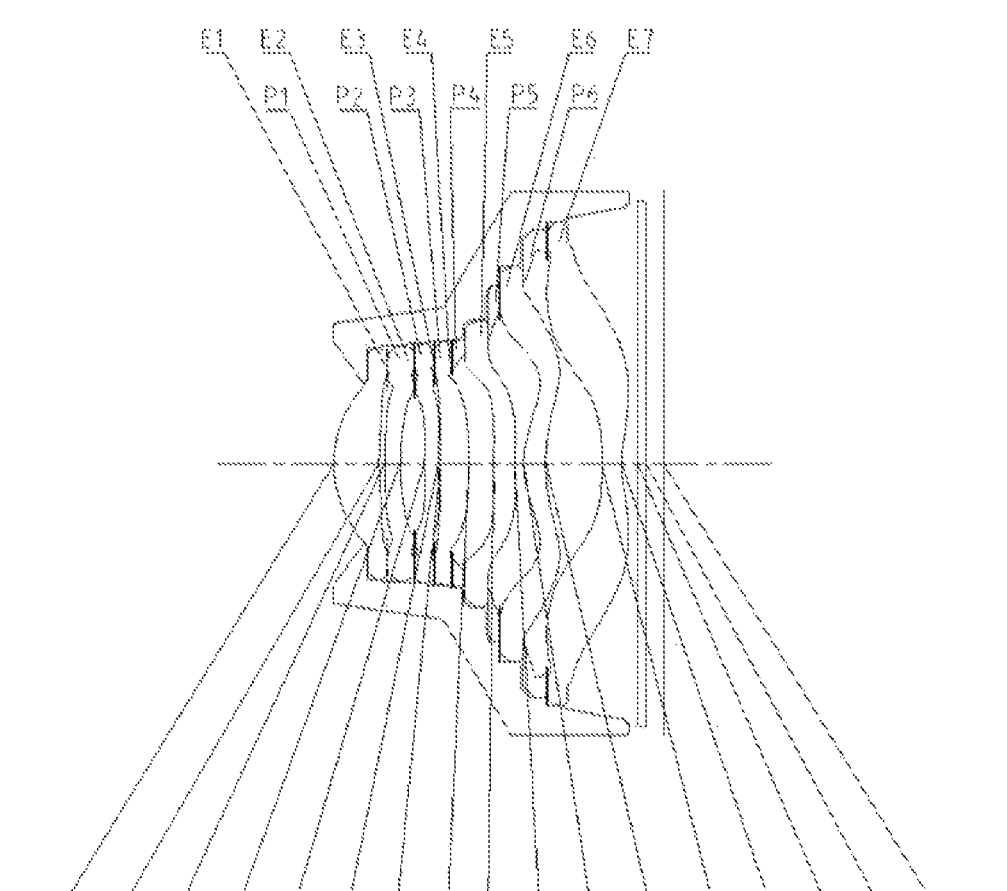
FIG. 12 illustrates a schematic structural diagram of an optical camera lens assembly according to Embodiment 4 of the present disclosure.

An optical camera lens assembly according to Embodiment 4 of the present disclosure is described below with reference to FIG. 12 to FIG. 14D. FIG. 12 to FIG. 13 respectively illustrate schematic structural diagrams of an optical camera lens assembly 410 and an optical camera lens assembly 420 according to Embodiment 4 of the present disclosure.

As shown in FIG. 12 to FIG. 13, the optical camera lens assembly 410 and the optical camera lens assembly 420 each may include a lens group, and the lens group, along an optical axis from an object side to an image side, sequentially includes: a diaphragm STO, a first lens E1, a second lens E2, a third lens E3, a fourth lens E4, a fifth lens E5, a sixth lens E6 and a seventh lens E7. Alternatively, the optical camera lens assembly 410 and the optical camera lens assembly 420 each may also include an optical filter E8 and an image plane S17.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a convex surface, and an image-side surface S4 of the second lens E2 is a concave surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a convex surface, and an image-side surface S10 of the fifth lens E5 is a concave surface. The sixth lens E6 has a positive refractive power, an object-side surface S11 of the sixth lens E6 is a convex surface, and an image-side surface S12 of the sixth lens E6 is a concave surface. The seventh lens E7 has a negative refractive power, an object-side surface S13 of the seventh lens E7 is a concave surface, and an image-side surface S14 of the seventh lens E7 is a concave surface. The optical filter E8 has an object-side surface S15 and an image-side surface S16. Light from an object sequentially passes through the surfaces S1-S16 and finally forms an image on the image plane S17.

In this example, half of a diagonal length of an effective pixel area on the image plane of each of the optical camera lens assembly 410 and the optical camera lens assembly 420 is 6.74 mm, and the aperture number Fno is 1.68.

Table 7 shows a table of basic parameters of the optical camera lens assembly 410 and the optical camera lens assembly 420 in Embodiment 4. Here, the units of a radius of curvature, a thickness/distance and a focal length are millimeters (mm). Table 8-1 and table 8-2 show the high-order coefficients applicable to the aspheric surfaces in Embodiment 4. Here, the surface type of each aspheric surface may be defined using the formula (1) given in Embodiment 1.

TABLE 7

| surface number | surface type | radius of curvature | thickness/distance | material refractive index | material abbe number | effective focal length | conic coefficient |
|---|---|---|---|---|---|---|---|
| OBJ | spherical | infinite | infinite | | | | |
| STO | spherical | infinite | −0.7650 | | | | |
| S1 | aspheric | 2.9040 | 1.1280 | 1.52 | 64.1 | 7.03 | 0.0000 |
| S2 | aspheric | 12.4322 | 0.1358 | | | | 0.0000 |
| S3 | aspheric | 10.2253 | 0.3922 | 1.69 | 17.7 | −25.03 | 0.0000 |
| S4 | aspheric | 6.3135 | 0.6045 | | | | 0.0000 |
| S5 | aspheric | 21.2437 | 0.3429 | 1.68 | 19.2 | −32.42 | 0.0000 |
| S6 | aspheric | 10.7240 | 0.0591 | | | | 0.0000 |
| S7 | aspheric | 40.7283 | 0.7059 | 1.55 | 55.9 | 21.62 | 0.0000 |
| S8 | aspheric | −16.5031 | 0.6272 | | | | 0.0000 |
| S9 | aspheric | 27.8170 | 0.5192 | 1.57 | 37.4 | −15.49 | 0.0000 |
| S10 | aspheric | 6.6553 | 0.2261 | | | | 0.0000 |
| S11 | aspheric | 2.2426 | 0.5530 | 1.55 | 55.9 | 6.05 | −1.0000 |
| S12 | aspheric | 6.3801 | 1.3905 | | | | 0.0000 |

TABLE 7-continued

| surface number | surface type | radius of curvature | thickness/distance | material refractive index | material abbe number | effective focal length | conic coefficient |
|---|---|---|---|---|---|---|---|
| S13 | aspheric | −149.7052 | 0.5015 | 1.55 | 55.9 | −5.59 | 0.0000 |
| S14 | aspheric | 3.0634 | 0.4005 | | | | −1.0000 |
| S15 | spherical | infinite | 0.2111 | 1.54 | 55.7 | | |
| S16 | spherical | infinite | 0.4269 | | | | |
| S17 | spherical | infinite | | | | | |

TABLE 8-1

| surface number | A4 | A6 | A8 | A10 | A12 | A14 | A16 |
|---|---|---|---|---|---|---|---|
| S1 | −3.3039E−03 | −4.7453E−03 | −2.3595E−03 | −6.9899E−04 | −1.7992E−04 | −3.3654E−05 | −1.3051E−05 |
| S2 | −5.7866E−02 | 7.5085E−03 | −3.1641E−03 | −1.1235E−04 | −5.0237E−04 | −1.1270E−04 | 2.5681E−05 |
| S3 | −4.7284E−03 | 2.3064E−02 | 9.7295E−04 | 1.1983E−03 | 2.6708E−05 | −3.9149E−06 | −2.7100E−05 |
| S4 | 1.9074E−02 | 1.1338E−02 | 1.3150E−03 | 8.9974E−04 | 3.0653E−04 | 9.8995E−05 | 4.5245E−05 |
| S5 | −2.3347E−01 | −8.9966E−03 | 1.0041E−03 | 1.2508E−03 | 2.5247E−04 | 1.5513E−04 | 5.3344E−06 |
| S6 | −3.3155E−01 | 1.6280E−02 | 6.2147E−03 | 2.8628E−03 | 1.4057E−03 | 4.5066E−04 | −2.7865E−04 |
| S7 | −1.5902E−01 | 1.7908E−02 | −3.7648E−03 | 2.7690E−03 | 3.3292E−03 | 7.3802E−04 | −4.0406E−04 |
| S8 | −3.2521E−01 | −1.7370E−02 | −3.5833E−03 | 6.2118E−03 | 7.3185E−03 | 4.5803E−03 | 2.0493E−03 |
| S9 | −9.0325E−01 | −3.6117E−02 | 3.1383E−02 | 3.1894E−02 | 4.9258E−03 | 2.0212E−03 | −1.4754E−03 |
| S10 | −1.7731E+00 | 4.5819E−01 | −3.5489E−02 | 8.6540E−03 | −3.2323E−02 | 1.1592E−02 | 2.7664E−03 |
| S11 | −4.9091E+00 | 8.8485E−01 | 6.5549E−02 | −6.2738E−02 | −4.7554E−02 | 3.4292E−02 | 1.6304E−03 |
| S12 | −2.3972E+00 | 5.3757E−02 | 1.5518E−01 | −1.0809E−01 | 4.5980E−02 | −2.5807E−03 | 4.6839E−03 |
| S13 | −2.0689E+00 | 1.3541E+00 | −6.9239E−01 | 2.9789E−01 | −1.0108E−01 | 1.5036E−02 | 1.3474E−03 |
| S14 | −7.4349E+00 | 1.8152E+00 | −4.7466E−01 | 1.7901E−01 | −8.6554E−02 | 2.7874E−02 | −2.2401E−02 |

TABLE 8-2

| surface number | A18 | A20 | A22 | A24 | A26 | A28 | A30 |
|---|---|---|---|---|---|---|---|
| S1 | −1.7022E−06 | −1.7405E−06 | 1.8777E−06 | 0.0000E+00 | 0.0000E+00 | 0.0000E+00 | 0.0000E+00 |
| S2 | 4.5363E−05 | 1.7342E−05 | 1.2357E−06 | 0.0000E+00 | 0.0000E+00 | 0.0000E+00 | 0.0000E+00 |
| S3 | 5.2722E−07 | −1.1405E−05 | −4.3861E−06 | −1.0666E−05 | 6.9579E−07 | 1.7078E−06 | 5.9674E−06 |
| S4 | 8.9512E−06 | 9.1218E−06 | 8.9361E−07 | 4.7647E−06 | −2.0510E−06 | −1.7017E−06 | −4.8032E−06 |
| S5 | 2.7318E−05 | −8.3657E−06 | 9.2746E−06 | −5.2870E−06 | 4.3903E−06 | −3.2994E−06 | 8.4165E−07 |
| S6 | −1.2219E−05 | −1.7892E−05 | −3.8323E−05 | −2.6315E−05 | 3.0582E−06 | 1.6315E−07 | −9.5083E−07 |
| S7 | 1.8885E−05 | −1.3453E−04 | −1.1789E−04 | −1.3629E−05 | 2.7182E−05 | 5.2886E−06 | 7.7089E−06 |
| S8 | 7.7033E−04 | 1.8693E−04 | −8.7301E−05 | −1.2570E−04 | −1.1678E−04 | −5.9409E−05 | −3.6075E−05 |
| S9 | −1.0202E−03 | −7.1137E−04 | −9.1243E−05 | 1.0064E−04 | 8.6715E−05 | 5.6246E−06 | −8.6959E−06 |
| S10 | 6.5763E−04 | −2.0278E−03 | −3.3388E−06 | 3.3274E−04 | 1.9876E−04 | −1.1186E−04 | −5.1785E−05 |
| S11 | −3.8617E−03 | −2.7266E−03 | 2.6323E−03 | −2.8332E−04 | −5.1070E−04 | −1.9949E−04 | 2.9373E−04 |
| S12 | −5.8975E−03 | 1.2308E−03 | −4.6370E−04 | −1.7679E−04 | −3.2049E−04 | 1.2159E−04 | 9.5557E−05 |
| S13 | 2.0388E−04 | −3.9590E−03 | 3.3487E−03 | −1.7966E−03 | 5.7444E−04 | −1.0654E−04 | −1.0887E−05 |
| S14 | 1.4350E−02 | −4.4839E−03 | 4.9012E−04 | −1.9472E−03 | 1.5047E−03 | −3.9360E−04 | 2.0876E−05 |

As shown in FIG. 12, the optical camera lens assembly 410 may also include spacer elements and a lens barrel for accommodating the above optical lens group and the spacing elements. The spacing elements include, for example, a first spacing element P1 disposed between the first lens E1 and the second lens E2, a second spacing element P2 disposed between the second lens E2 and the third lens E3, a third spacing element P3 disposed between the third lens E3 and the fourth lens E4, a fourth spacing element P4 disposed between the fourth lens E4 and the fifth lens E5, a fifth spacing element P5 disposed between the fifth lens E5 and the sixth lens E6, and a sixth spacing element P6 disposed between the sixth lens E6 and the seventh lens E7.

As shown in FIG. 13, the optical camera lens assembly 420 may also include spacer elements and a lens barrel for accommodating the above optical lens group and the spacing elements. The spacing elements include, for example, a first spacing element P1 disposed between the first lens E1 and the second lens E2, a second spacing element P2 disposed between the second lens E2 and the third lens E3, a third spacing element P3 disposed between the third lens E3 and the fourth lens E4, a fourth spacing element P4 disposed between the fourth lens E4 and the fifth lens E5, a fifth spacing element P5 disposed between the fifth lens E5 and the sixth lens E6, and a sixth spacing element P6 disposed between the sixth lens E6 and the seventh lens E7.

In the exemplary implementations, the first spacing element P1 may be in contact with the image-side surface of the first lens E1, the second spacing element P2 may be in contact with the image-side surface of the second lens E2, the third spacing element P3 may be in contact with the image-side surface of the third lens E3, the fourth spacing element P4 may be in contact with the image-side surface of the fourth lens E4, the fifth spacing element P5 may be in contact with the image-side surface of the fifth lens E5, and the sixth spacing element P6 may be in contact with the image-side surface of the sixth lens E6.

Figure 14C:
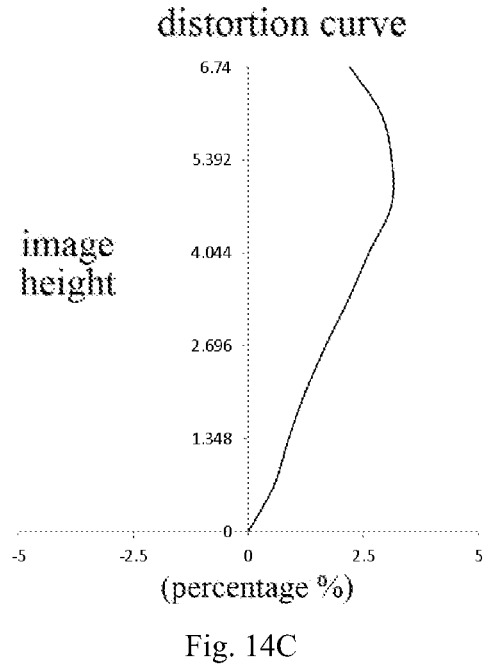
Figure 14D:
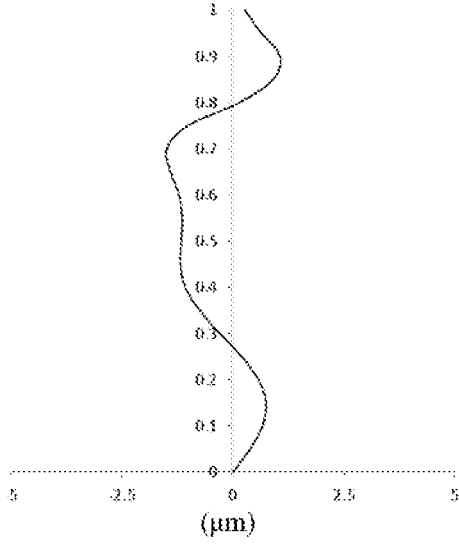

FIG. 14A illustrates a longitudinal aberration curve of the optical camera lens assembly according to Embodiment 4, representing deviations of focal points converged by light of different wavelengths which passes through the lens assembly. FIG. 14B illustrates an astigmatic curve of the optical camera lens assembly according to Embodiment 4, representing a curvature of a tangential image plane and a curvature of a sagittal image plane. FIG. 14C illustrates a distortion curve of the optical camera lens assembly according to Embodiment 4, representing amounts of distortion corresponding to different image heights. FIG. 14D illustrates a lateral color curve of the optical camera lens assembly according to Embodiment 4, representing deviations of different image heights on the image plane formed by light passing through the lens assembly. It can be seen from FIGS. 14A-14D that the optical camera lens assembly given in Embodiment 4 can achieve a good imaging quality.

Specific dimensional parameters of the optical camera lens assemblies provided in Embodiment 1 to Embodiment 4 of the present disclosure are as shown in Table 9 and satisfy relationships shown in Table 10, respectively.

TABLE 9

| parameter(mm)\ embodiment - optical camera | embodiment 1 | | embodiment 2 | | embodiment 3 | | embodiment 4 | |
|---|---|---|---|---|---|---|---|---|
| lens assembly number | 110 | 120 | 210 | 220 | 310 | 320 | 410 | 420 |
| EP01 | 1.415 | 1.415 | 1.331 | 1.331 | 1.270 | 1.270 | 1.335 | 1.335 |
| EP12 | 0.536 | 0.536 | 0.538 | 0.538 | 0.525 | 0.525 | 0.665 | 0.665 |
| EP23 | 0.476 | 0.476 | 0.511 | 0.511 | 0.508 | 0.508 | 0.477 | 0.477 |
| EP34 | 0.366 | 0.489 | 0.406 | 0.539 | 0.387 | 0.535 | 0.416 | 0.561 |
| EP45 | 0.797 | 0.674 | 0.895 | 0.762 | 0.825 | 0.676 | 0.887 | 0.742 |
| EP56 | 0.412 | 0.412 | 0.598 | 0.598 | 0.544 | 0.544 | 0.594 | 0.594 |
| d1s | 3.703 | 3.703 | 3.795 | 3.795 | 3.650 | 3.650 | 3.708 | 3.708 |
| d2s | 3.279 | 3.279 | 3.417 | 3.417 | 3.279 | 3.279 | 3.294 | 3.294 |
| d3s | 3.948 | 3.948 | 3.948 | 3.948 | 3.948 | 3.948 | 3.919 | 3.919 |
| D3s | 6.100 | 6.600 | 6.100 | 6.100 | 6.100 | 6.300 | 6.100 | 6.200 |
| D4s | 6.200 | 7.000 | 6.200 | 6.199 | 6.200 | 6.640 | 6.200 | 7.000 |
| d4s | 4.464 | 4.704 | 4.474 | 4.636 | 4.459 | 4.675 | 4.444 | 4.623 |
| d5m | 7.745 | 7.745 | 7.745 | 7.745 | 7.958 | 7.958 | 7.684 | 7.684 |
| CP2 | 0.018 | 0.018 | 0.018 | 0.018 | 0.018 | 0.018 | 0.018 | 0.018 |
| CP3 | 0.018 | 0.018 | 0.018 | 0.018 | 0.018 | 0.018 | 0.018 | 0.018 |
| CP4 | 0.018 | 0.018 | 0.018 | 0.018 | 0.018 | 0.018 | 0.018 | 0.018 |
| CP5 | 0.018 | 0.297 | 0.018 | 0.311 | 0.018 | 0.325 | 0.018 | 0.290 |
| CP6 | 0.781 | 0.799 | 0.587 | 0.587 | 0.683 | 0.683 | 0.595 | 0.595 |
| ΣEP | 2.586 | 2.586 | 2.948 | 2.948 | 2.787 | 2.787 | 3.039 | 3.039 |
| ΣCP | 0.871 | 1.168 | 0.677 | 0.970 | 0.773 | 1.080 | 0.685 | 0.957 |

TABLE 10

| conditional expression\ embodiment-optical camera | embodiment 1 | | embodiment 2 | | embodiment 3 | | embodiment 4 | |
|---|---|---|---|---|---|---|---|---|
| lens assembly number | 110 | 120 | 210 | 220 | 310 | 320 | 410 | 420 |
| (EP01 + CT1)/T12 | 17.23 | 17.23 | 15.58 | 15.58 | 14.60 | 14.60 | 18.14 | 18.14 |
| (d1s − d2s + CT2)/CP2 | 42.15 | 42.15 | 40.17 | 40.17 | 38.13 | 38.13 | 44.78 | 44.78 |
| (R3 + R4)/d3s | 3.32 | 3.32 | 4.62 | 4.62 | 4.50 | 4.50 | 4.22 | 4.22 |
| (R5 − R6)/(d3s − d2s) | 13.87 | 13.87 | 15.39 | 15.39 | 12.73 | 12.73 | 16.82 | 16.82 |
| (T23 + EP23)/CP3 | 57.64 | 57.64 | 59.14 | 59.14 | 58.23 | 58.23 | 60.11 | 60.11 |
| f3/D3s | −5.08 | −4.69 | −5.09 | −5.09 | −4.23 | −4.10 | −5.31 | −5.23 |
| (R7 + R8)/(D4s + d4s) | 4.27 | 3.89 | 2.30 | 2.26 | 1.46 | 1.37 | 2.28 | 2.08 |
| (CT4 + T34)/(EP34 + CP4) | 2.00 | 1.51 | 1.92 | 1.46 | 1.98 | 1.45 | 1.76 | 1.32 |
| R9/d5m | 5.07 | 5.07 | 3.78 | 3.78 | 3.76 | 3.76 | 3.62 | 3.62 |
| (EP45 + CT5)/(T45 + CP5) | 2.08 | 1.30 | 2.22 | 1.39 | 2.16 | 1.30 | 2.18 | 1.38 |
| (EP56 + CT6 + CP6)/T56 | 7.23 | 7.30 | 7.46 | 7.46 | 6.75 | 6.75 | 7.70 | 7.70 |
| ΣEP/ΣCP | 2.97 | 2.21 | 4.35 | 3.04 | 3.61 | 2.58 | 4.44 | 3.18 |

The present disclosure further provides an imaging apparatus having an electronic photosensitive element which may be a photosensitive charge-coupled device (CCD) or complementary metal-oxide semiconductor element (CMOS). The imaging apparatus may be an independent imaging device such as a digital camera, or may be an imaging module integrated in a mobile electronic device such as a mobile phone. The imaging apparatus is equipped with the optical camera lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combination of the above technical features or equivalent features thereof without departing from the concept of the invention, for example, technical solutions formed by replacing the features as disclosed in the present disclosure with (but not limited to) technical features with similar functions.

What is claimed is:

1. An optical camera lens assembly, comprising:
a lens group, comprising a first lens, a second lens, a third lens, a fourth lens, a fifth lens, a sixth lens and a seventh lens arranged sequentially along an optical axis from an object side to an image side, wherein, each of the first lens, the fourth lens, and the sixth lens has a positive refractive power, and each of the second lens, the third lens, the fifth lens, and the seventh lens has a negative refractive power; and
a plurality of spacing elements, comprising a third spacing element disposed between the third lens and the fourth lens and in contact with an image-side surface of the third lens;
the optical camera lens assembly satisfies:
$3.0 < (R3+R4)/d3s < 5.0$,
wherein, R3 is a radius of curvature of an object-side surface of the second lens, R4 is a radius of curvature of an image-side surface of the second lens, and d3s is an inner diameter of an object-side surface of the third spacing element,
wherein the plurality of spacing elements further comprise a fourth spacing element disposed between the fourth lens and the fifth lens and in contact with an image-side surface of the fourth lens and a fifth spacing element disposed between the fifth lens and the sixth lens and in contact with an image-side surface of the fifth lens, and
the optical camera lens assembly satisfies:
$1.0 < (EP45+CT5)/(T45+CP5) < 2.5$,
wherein, EP45 is a spacing between the fourth spacing element and the fifth spacing element, CP5 is a maximum thickness of the fifth spacing element, CT5 is a center thickness of the fifth lens on the optical axis, and T45 is an air spacing between the fourth lens and the fifth lens on the optical axis.

2. The optical camera lens assembly according to claim 1, wherein the optical camera lens assembly further comprises a lens barrel, the lens barrel is configured to accommodate the lens group and the plurality of spacing elements, the plurality of spacing elements further comprise a first spacing element disposed between the first lens and the second lens and in contact with an image-side surface of the first lens, and the optical camera lens assembly satisfies:
$14.0 < (EP01+CT1)/T12 < 19.0$,
wherein, EP01 is a distance from an object-side end surface of the lens barrel to the first spacing element in a direction of the optical axis, CT1 is a center thickness of the first lens on the optical axis, and T12 is an air spacing between the first lens and the second lens on the optical axis.

3. The optical camera lens assembly according to claim 1, wherein the plurality of spacing elements further comprise a first spacing element disposed between the first lens and the second lens and in contact with an image-side surface of the first lens and a second spacing element disposed between the second lens and the third lens and in contact with the image-side surface of the second lens, and
the optical camera lens assembly satisfies:
$38.0 < (d1s-d2s+CT2)/CP2 < 45.0$,
wherein, CT2 is a center thickness of the second lens on the optical axis, d1s is an inner diameter of an object-side surface of the first spacing element, d2s is an inner diameter of an object-side surface of the second spacing element, and CP2 is a maximum thickness of the second spacing element.

4. The optical camera lens assembly according to claim 3, wherein the optical camera lens assembly satisfies:
$12.0 < (R5-R6)/(d3s-d2s) < 17.0$,
wherein, d2s is the inner diameter of the object-side surface of the second spacing element, d3s is an inner diameter of an object-side surface of the third spacing element, R5 is a radius of curvature of a object-side surface of the third lens, and R6 is a radius of curvature of the image-side surface of the third lens.

5. The optical camera lens assembly according to claim 1, wherein the plurality of spacing elements further comprise a second spacing element disposed between the second lens and the third lens and in contact with the image-side surface of the second lens, and
the optical camera lens assembly satisfies:
$57.0 < (T23+EP23)/CP3 < 61.0$,
wherein, T23 is an air spacing between the second lens and the third lens on the optical axis, CP3 is a maximum thickness of the third spacing element, and EP23 is a spacing between the second spacing element and the third spacing element.

6. The optical camera lens assembly according to claim 1, wherein the optical camera lens assembly satisfies:
$-5.5 < f3/D3s < -4.0$,
wherein, f3 is an effective focal length of the third lens, and D3s is an outer diameter of the object-side surface of the third spacing element.

7. The optical camera lens assembly according to claim 1, wherein
the optical camera lens assembly satisfies:
$1.0 < (R7+R8)/(D4s+d4s) < 5.0$,
wherein, R7 is a radius of curvature of an object-side surface of the fourth lens, R8 is a radius of curvature of anthe image-side surface of the fourth lens, D4s is an outer diameter of an object-side surface of the fourth spacing element, and d4s is an inner diameter of the object-side surface of the fourth spacing element.

8. The optical camera lens assembly according to claim 7, wherein the optical camera lens assembly satisfies:
$1.0 < (CT4+T34)/(EP34+CP4) < 2.5$,
wherein, CT4 is a center thickness of the fourth lens on the optical axis, T34 is an air spacing between the third lens and the fourth lens on the optical axis, EP34 is a spacing between the third spacing element and the fourth spacing element, and CP4 is a maximum thickness of the fourth spacing element.

9. The optical camera lens assembly according to claim 1, wherein the optical camera lens assembly satisfies:
3.5<R9/d5m<5.5, wherein, R9 is a radius of curvature of an object-side surface of the fifth lens, and d5m is an inner diameter of an image-side surface of the fifth spacing element.

10. The optical camera lens assembly according to claim 9, wherein the plurality of spacing elements further comprise a sixth spacing element disposed between the sixth lens and the seventh lens and in contact with an image-side surface of the sixth lens, and the optical camera lens assembly satisfies:
6.0<(EP56+CT6+CP6)/T56<8.0, wherein, CT6 is a center thickness of the sixth lens on the optical axis, T56 is an air spacing between the fifth lens and the sixth lens on the optical axis, EP56 is a spacing between the fifth spacing element and the sixth spacing element, and CP6 is a maximum thickness of the sixth spacing element.

11. The optical camera lens assembly according to claim 1, wherein the optical camera lens assembly satisfies:
ImgH>6.7 mm;
FNO<1.7; and
2.0<ΣEP/ΣCP<4.5, wherein, ΣCP is a sum of a maximum thickness of each spacing element in the plurality of spacing elements, ΣEP is a sum of spacing distances between two adjacent spacing elements in the plurality of spacing elements, ImgH is half of a diagonal length of an effective pixel area on an image plane of the optical camera lens assembly, and Fno is a relative F number of the optical camera lens assembly.

12. The optical camera lens assembly according to claim 2, wherein the optical camera lens assembly satisfies:
ImgH>6.7 mm;
FNO<1.7; and
2.0<ΣEP/ΣCP<4.5, wherein, ΣCP is a sum of a maximum thickness of each spacing element in the plurality of spacing elements, ΣEP is a sum of spacing distances between two adjacent spacing elements in the plurality of spacing elements, ImgH is half of a diagonal length of an effective pixel area on an image plane of the optical camera lens assembly, and Fno is a relative F number of the optical camera lens assembly.

13. The optical camera lens assembly according to claim 3, wherein the optical camera lens assembly satisfies:
ImgH>6.7 mm;
FNO<1.7; and
2.0<ΣEP/ΣCP<4.5, wherein, ΣCP is a sum of a maximum thickness of each spacing element in the plurality of spacing elements, ΣEP is a sum of spacing distances between two adjacent spacing elements in the plurality of spacing elements, ImgH is half of a diagonal length of an effective pixel area on an image plane of the optical camera lens assembly, and Fno is a relative F number of the optical camera lens assembly.

14. The optical camera lens assembly according to claim 4, wherein the optical camera lens assembly satisfies:
ImgH>6.7 mm;
FNO<1.7; and
2.0<ΣEP/ΣCP<4.5, wherein, ΣCP is a sum of a maximum thickness of each spacing element in the plurality of spacing elements, ΣEP is a sum of spacing distances between two adjacent spacing elements in the plurality of spacing elements, ImgH is half of a diagonal length of an effective pixel area on an image plane of the optical camera lens assembly, and Fno is a relative F number of the optical camera lens assembly.

15. The optical camera lens assembly according to claim 5, wherein the optical camera lens assembly satisfies:
ImgH>6.7 mm;
FNO<1.7; and
2.0<ΣEP/ΣCP<4.5, wherein, ΣCP is a sum of a maximum thickness of each spacing element in the plurality of spacing elements, ΣEP is a sum of spacing distances between two adjacent spacing elements in the plurality of spacing elements, ImgH is half of a diagonal length of an effective pixel area on an image plane of the optical camera lens assembly, and Fno is a relative F number of the optical camera lens assembly.

16. The optical camera lens assembly according to claim 6, wherein the optical camera lens assembly satisfies:
ImgH>6.7 mm;
FNO<1.7; and
2.0<ΣEP/ΣCP<4.5, wherein, ΣCP is a sum of a maximum thickness of each spacing element in the plurality of spacing elements, ΣEP is a sum of spacing distances between two adjacent spacing elements in the plurality of spacing elements, ImgH is half of a diagonal length of an effective pixel area on an image plane of the optical camera lens assembly, and Fno is a relative F number of the optical camera lens assembly.

17. The optical camera lens assembly according to claim 7, wherein the optical camera lens assembly satisfies:
ImgH>6.7 mm;
FNO<1.7; and
2.0<ΣEP/ΣCP<4.5, wherein, ΣCP is a sum of a maximum thickness of each spacing element in the plurality of spacing elements, ΣEP is a sum of spacing distances between two adjacent spacing elements in the plurality of spacing elements, ImgH is half of a diagonal length of an effective pixel area on an image plane of the optical camera lens assembly, and Fno is a relative F number of the optical camera lens assembly.

18. The optical camera lens assembly according to claim 8, wherein the optical camera lens assembly satisfies:
ImgH>6.7 mm;
FNO<1.7; and
2.0<ΣEP/ΣCP<4.5, wherein, ΣCP is a sum of a maximum thickness of each spacing element in the plurality of spacing elements, ΣEP is a sum of spacing distances between two adjacent spacing elements in the plurality of spacing elements, ImgH is half of a diagonal length of an effective pixel area on an image plane of the optical camera lens assembly, and Fno is a relative F number of the optical camera lens assembly.

19. The optical camera lens assembly according to claim 9, wherein the optical camera lens assembly satisfies:
ImgH>6.7 mm;
FNO<1.7; and
2.0<ΣEP/ΣCP<4.5, wherein, ΣCP is a sum of a maximum thickness of each spacing element in the plurality of spacing elements, ΣEP is a sum of spacing distances between two adjacent spacing elements in the plurality of spacing elements, ImgH is half of a diagonal length of an effective pixel area on an image plane of the optical camera lens assembly, and Fno is a relative F number of the optical camera lens assembly.

20. An optical camera lens assembly, comprising:

a lens group, comprising a first lens, a second lens, a third lens, a fourth lens, a fifth lens, a sixth lens and a seventh lens arranged sequentially along an optical axis from an object side to an image side, wherein, each of the first lens, the fourth lens, and the sixth lens has a positive refractive power, and each of the second lens, the third lens, the fifth lens, and the seventh lens has a negative refractive power; and a plurality of spacing elements, comprising a third spacing element disposed between the third lens and the fourth lens and in contact with an image-side surface of the third lens;

the optical camera lens assembly satisfies:

$3.0 < (R3+R4)/d3s < 5.0$, wherein, R3 is a radius of curvature of an object-side surface of the second lens, R4 is a radius of curvature of an image-side surface of the second lens, and d3s is an inner diameter of an object-side surface of the third spacing element, wherein the plurality of spacing elements further comprise a second spacing element disposed between the second lens and the third lens and in contact with the image-side surface of the second lens, and the optical camera lens assembly satisfies:

$57.0 < (T23+EP23)/CP3 < 61.0$, wherein, T23 is an air spacing between the second lens and the third lens on the optical axis, CP3 is a maximum thickness of the third spacing element, and EP23 is a spacing between the second spacing element and the third spacing element.

\* \* \* \* \*